United States Patent [19]

Burton et al.

[11] Patent Number: 4,794,632
[45] Date of Patent: Dec. 27, 1988

[54] TELEPHONE TRUNK LINE TESTING CIRCUITRY

[75] Inventors: Peter G. Burton, Austin; James K. Kennedy, Round Rock, both of Tex.

[73] Assignee: Minnesota Mining and Manufacturing Company, St. Paul, Minn.

[21] Appl. No.: 52,446

[22] Filed: May 20, 1987

[51] Int. Cl.[4] ............................................. H04M 3/32
[52] U.S. Cl. ........................................ 379/22; 379/29
[58] Field of Search ................ 379/23, 22, 29; 370/14

[56] References Cited
U.S. PATENT DOCUMENTS
4,314,110  2/1982  Breidenstein et al. ................ 379/23

Primary Examiner—Stafford D. Schreyer
Attorney, Agent, or Firm—Donald M. Sell; Walter N. Kirn; Robert L. Marben

[57] ABSTRACT

Telephone trunk line testing circuitry for connection to a private branch exchange (PBX) and the telephone trunk lines for the PBX including a microcomputer unit (MCU), switching circuitry, a DTMF receiver, and a tone generator for connecting one of the trunk lines as a control trunk for the circuitry. Under the control of the MCU programmed to respond to DTMF various signal commands sent from a telephone at the far end of the control trunk the circuitry operates to selectively disconnect (isolating) one of the other trunks at a time from the PBX and connect it to the circuitry with the circuitry configured under control of the MCU for completing various test involving the trunk under test (TUT), control trunk, switching circuitry and the tone generator, including the supply of tone signals from the tone generator during some of the test configurations.

17 Claims, 30 Drawing Sheets

TELEPHONE TRUNK LINE TESTING CIRCUITRY

BACKGROUND OF THE INVENTION

The invention presented herein relates to telephone trunk line testing circuitry for connection to a private branch exchange (PBX) and the telephone trunk lines for the PBX wherein the circuitry is operable from a remote location via a control trunk line to selectively isolate a trunk from the PBX and provide various connections to the selected trunk line and control trunk to carry out certain tests to determine whether the selected trunk is the source of a trunk transmission problem.

Trunk lines supplied by a telephone company for use by a private branch exchange (PBX) are to some extent repaired and maintained by the telephone company. A demarcation point exists near the PBX at which the trunk lines are connected with lines then connecting between the demarcation point and the PBX. The telephone company has responsibility only for the trunk lines between the demarcation point and the telephone company central office with the user of the PBX having responsibility for any lines and equipment on the PBX side of the demarcation point. This is a recent departure from past practice where the responsibility of the telephone company also extended to the PBX side of the demarcation point.

A problem is presented to the user of a PBX in that transmission problems can be encountered and it is not known on which side of the demarcation point the source of the problem exists. It is desirable that from the standpoint of time required to correct a problem as well as cost to the user of the PBX that the PBX user have a way for testing the trunk lines on the telephone company side of the demarcation to determine that the source of a problem that is within the telephone company's area of responsibility before requesting the service of the telephone company.

Prior efforts that have been made for making such tests include the use of test circuitry at the PBX end which can only be accessed from the central office or which require a direct dedicated circuit for reaching the test circuitry or the assignment of a line number to the test equipment. Other test equipment is known which is connected physically to one end of a trunk line which requires the connection of a special activation source from the other end of the circuit connected to the test equipment requiring use of such activation source at the telephone central office.

SUMMARY OF THE INVENTION

The invention presented herein avoids the shortcomings of the prior known arrangements in that it provides for test equipment at the demarcation point which can be accessed from any dial tone type telephone using a trunk line for the PBX that is not assigned for only making connection with the test equipment and provides for isolation of each trunk line from the PBX that is to be tested.

The invention is embodied in telephone trunk line testing circuitry for connection to a private branch exchange (PBX) and the plurality telephone trunk lines of the public telephone system provided for the PBX which includes a microcomputer unit (MCU); first means connected to the MCU and having a receive input and a transmit output for transmission of signals under the control of the MCU between the receive input and the transmit output; a dual tone multiple frequency (DTMF) receiver connected to the MCU and operably connected to receive any signals presented to the receive input; a tone generator operatively controlled by the MCU and operatively connected to the transmtt output; a first pair of transmission paths; a second pair of transmission paths; a first switching means operatively controlled by the MCU programmed for selectively providing any one of three connecting conditions which are: (1) connecting the first pair of transmission paths to the receive input and the second pair of transmission paths to the transmit output; (2) connecting the first pair of transmission paths to the transmit output and the second pair of transmission paths to the receive input; and (3) connecting the first pair of transmission paths to the second pair of transmission paths. A first switch means is provided also that is operably connected to the MCU for selecting a trunk line as a control trunk line plus and a second means operably controlled by the MCU, when the first switching means presents the connecting condition (1), for coupling the control trunk line selected by operation of the first switch means to the first pair of transmission paths following the completion of a call via the public telephone system between a DTMF type telephone and the control trunk line selected by operation of the first switch means, the control trunk when so connected serving to transmit any DTMF signals to the DTMF receiver that are generated by operation of the keyboard of the DTMF type telephone.

The MCU is also programmed for responding to a predetermined series of DTMF signals received by the DTMF receiver, after a control trunk line has been coupled to the first pair of transmission paths by the second means, to cause the first switching means to provide the connecting condition (2) and then cause the tone generator to provide a signal at a selected frequency for transmission at a predetermined power level to the connected control trunk for a limited period of time via the connecting condition (2) which provides the signal to the control trunk for use in establishing a measure of its transmission quality.

The telephone trunk line testing circuitry also includes a third means operably controlled by the MCU plus a third pair of transmission paths; the MCU responding to at least one command, comprising DTMF signals received via said DTMF receiver, for causing the third means to disconnect (isolate) one of the other trunk lines from the PBX and connect it to said third pair of transmission paths thus enabling connection of the various trunk lines to the circuitry for testing including termination of such connection after a limited period of time.

The circuitry also includes use of the second switch means positionable for coupling the third pair of transmission paths to the second pair of transmission paths with programming of the MCU causing the third means to disconnect (isolate) one of the other trunks from the PBX and connect it to the third pair of transmission paths with connecting condition (2) provided and the second switch means positioned to couple the second and third transmission paths for a period of time to provide for detection of a dial tone at the far end of the control trunk followed by its termination.

The MCU is also programmed to respond to a command in the form of DTMF signals provided from the far end of the control trunk to answer a call made to a trunk line that has been connected to the third pair of transmission paths for testing and then by commands in the form of DTMF signals provided from the far end of the control trunk to establish the connection condition (3) for a period of time whereby a two-way talk path is provided for a limited time between the far end of the trunk connected to the third pair of transmission paths and the far end of the control trunk or provide a transmission path for listening for a limited time to transmissions placed on the trunk line connected for testing or send a signal for a limited time at a selected frequency and at a predetermined level to the trunk line connected for testing.

The MCU is also programmed to respond to a command in the form of DTMF signals provided from the far end of the control trunk after a trunk line is isolated from the PBX and connected for testing with the third pair of transmission paths not coupled to the second pair of transmission patss to dial a telephone number and then provide connecting condition (3) for a limited period of time whereby a two-way transmission path is provided between the far end of the control trunk and the telephone dialed. With such arrangement established, other commands in the form of DTMF signals provided from the far end of the control trunk can provide for the two-way transmission path again or provide a transmission path for listening for a limited time period to transmission from the telephone dialed or send a signal for a limited time at a selected frequency and at a predetermined level to the telephone dialed.

The MCU is also programmed to require entry of a password by use of DTMF signals before commands in the form of DTMF signals can be provided to the DTMF receiver.

BRIEF DESCRIPTION OF THE DRAWINGS

A better understanding of this invention including its novel features and utility will be obtained upon the consideration, of the following detailed description and accompanying drawings wherein.

DETAILED DESCRIPTION

Figure 1:
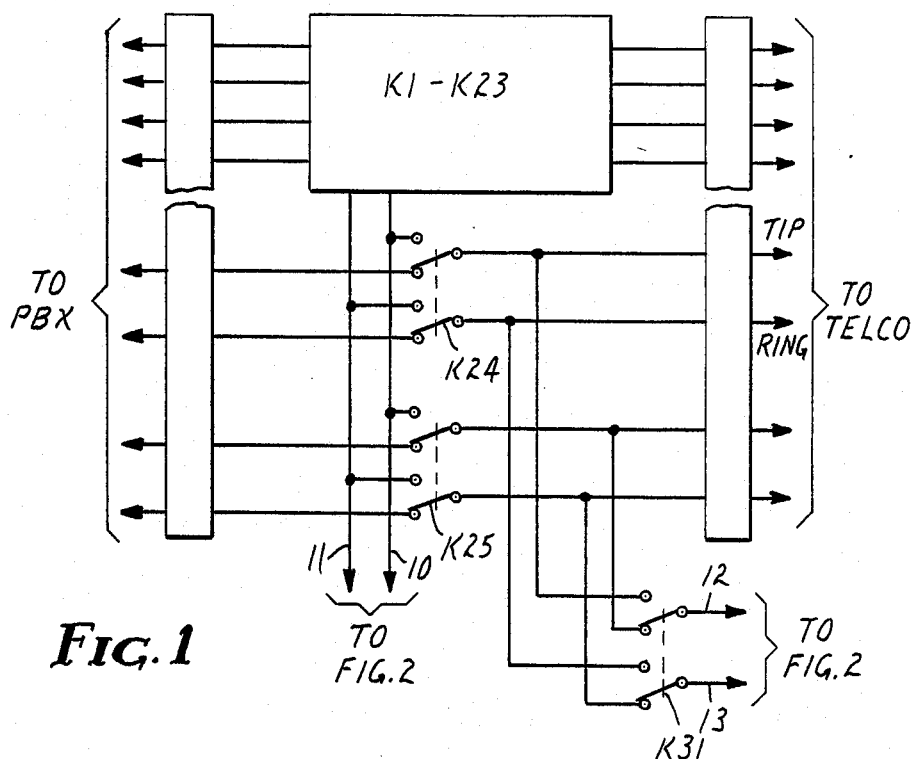
FIG. 1 is a schematic showing of a portion of the testing circuitry embodying the invention.
Figure 2:
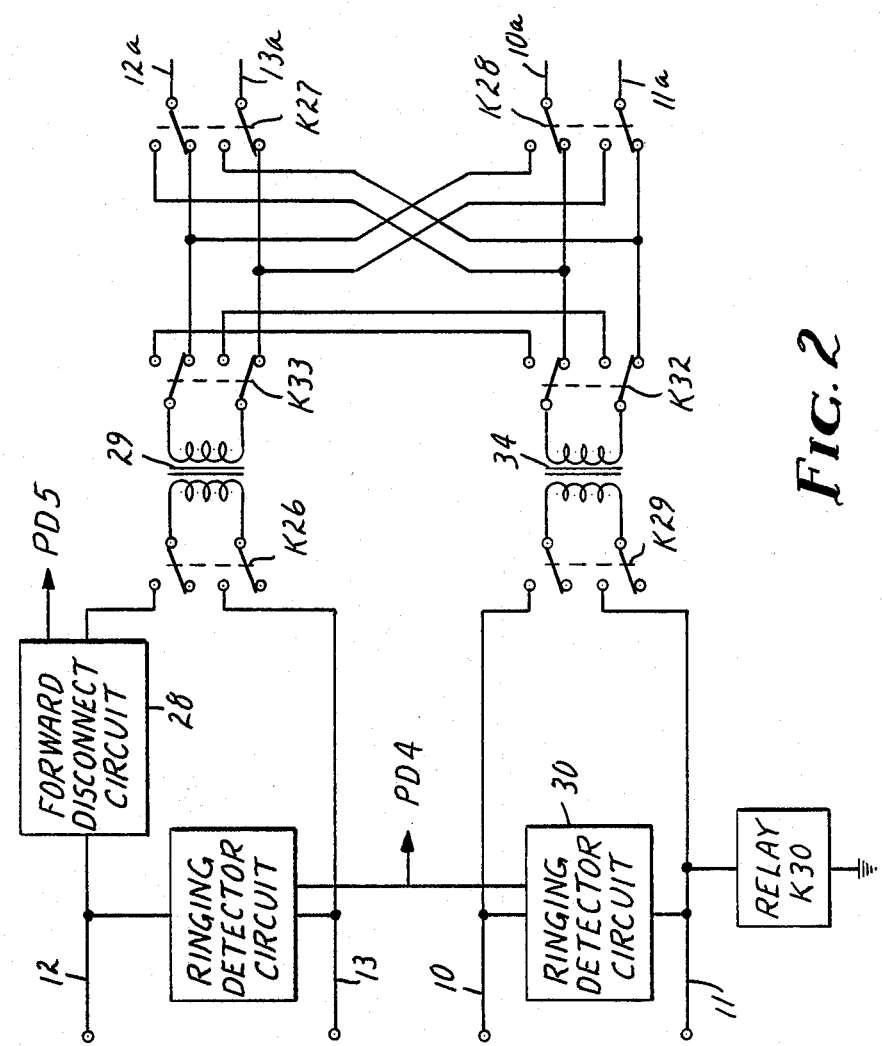
FIG. 2 is a schematic showing of another portion of the testing circuitry embodying the invention.
Figure 3:
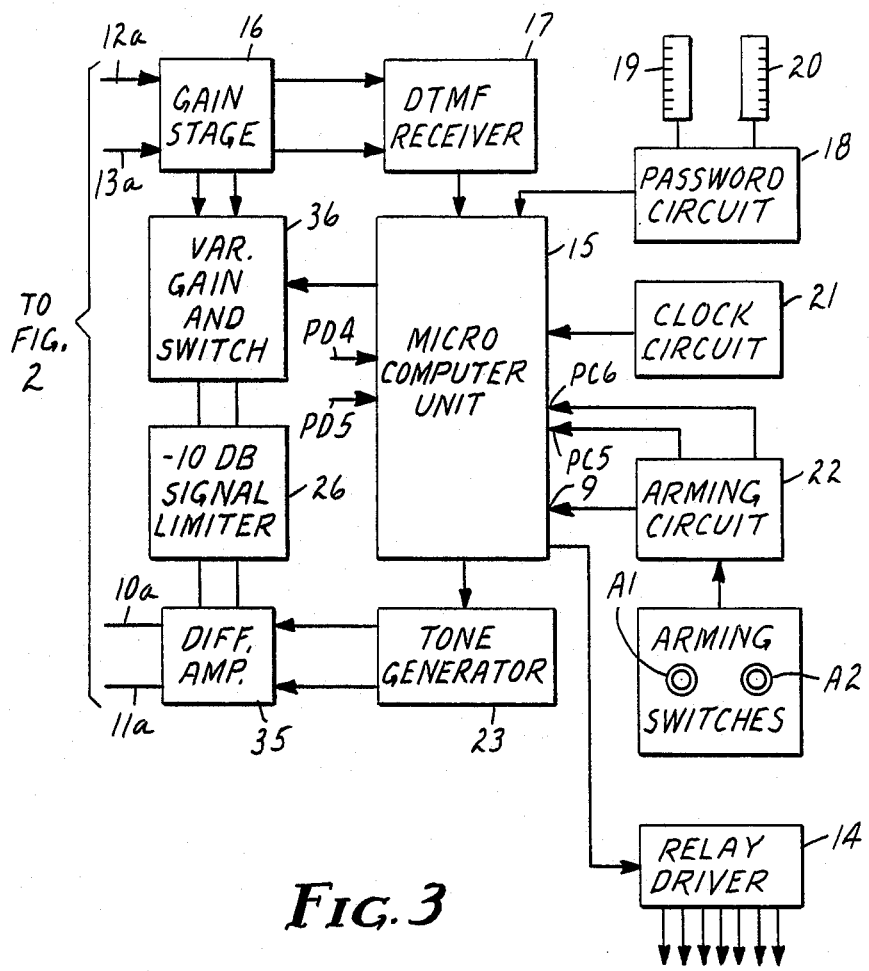
FIG. 3 is a schematic showing of a further portion of the testing circuitry embodying the invention.
Figure 36:
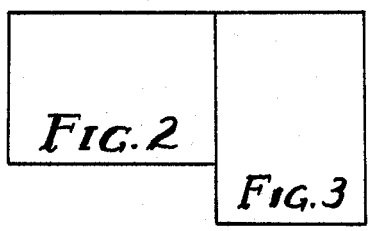
FIG. 36 is a showing of how FIGS. 2 and 3 can be placed when considering the Figures in connection with the following detailed description.

The test circuitry embodying the invention presented herein is shown in FIGS. 1, 2 and 3. FIGS. 2 and 3 and can be viewed together if they are positioned as indicated in FIG. 36 which appears with FIG. 3. The circuitry portion shown in FIG. 1 shows how the testing circuitry is connected relative to a private exchange branch (PBX) and the telephone company trunk lines for the PBX. The circuitry of FIG. 1 includes a bank of relays K1-K25 which enables the circuitry to accommodate up to 25 trunk lines. One of the K1-K25 relays is used for each trunk line and serves to connect the trunk line to the PBX when the relay is de-energized. Referring to relay K24, which is representatve of the relays, the relay has two movable contacts, each movable contact being associated with two fixed contacts. When the relay is de-energized, each movable contact makes contact with one of the fixed contacts. As shown in FIG. 1, the upper movable contact is connected to the tip side of a trunk line while the lower movable contact is connected to the ring side of such trunk line. The fixed contact to which the upper movable contact makes contact while the relay is de-energized is connected to the PBX as is the fixed contact which makes contact with the lower movable contact. As shown in FIG. 1, relay K24 provides a direct connection of the trunk line to the PBX when relay K24 is de-energized.

Two transmission paths or conductors 10, 11 are provided which are common to each of the relays K1-K25. Referring to relay K24, the upper fixed contact for the upper movable contact is connected to conductor 10 while the upper fixed contact for the lower movable contact is connected to conductor 11. When relay K24 is energized, the trunk line connecting with relay K24 is disconnected from the PBX and is connected to the conductors 10 and 11. Only one of relays K1-K25 is operated at any given time to connect its associated trunk line to the conductors 10 and 11. When a trunk line is so connected it is referred to as a trunk under test or TUT.

Testing of a trunk line requires the use of one of the trunk lines as a control trunk and in this connection the trunk lines connecting to relays K24 and K25 are connected so either is available for use as a control trunk. Relay K31 is used for providing the needed connections of one of the two trunks as a control trunk. Relay K31 is similar to the relays K1-K24 and is shown in the de-energized condition causing only the trunk line for relay K25 to be connected to the circuitry of FIG. 2 as a control trunk. When relay K31 is energized, only the trunk line connected to relay K24 is then connected to the circuitry of FIG. 2 as a control trunk. The conductors 12, 13, which connect to the movable contacts of relay K31, connect with the circuitry shown in FIG. 2.

All of the relays shown in FIG. 1, as well as relays K32, K33 and K26-K29 in FIG. 2, have their relay coil (not shown) energized via the relay driver 14 of FIG. 3 which is connected for control by a microcomputer unit (MCU) 15.

The circuitry of FIG. 3 also includes a gain stage 16, a dual tone multiple frequency (DTMF) receiver 17, a password circuit 18, two dip switches 19, 20, a clock circuit 21, an arming circuit 22, two arming switches A1, A2, a tone generator 23, a differential amplifier 35, a variable gain and switch circuit 36, and a −10 DB signal limiter 26.

The gain stage 16 provides a receive input for the circuitry of FIG. 3 to which two transmission paths 12A and 13A are connected. The output of the gain stage 16 is connected to the DTMF receiver 17, which in turn is connected to the microcomputer unit 15. The gain stage 16 also has its output connected to the variable gain and switch circuit 36 which in turn has its output connected to the −10 DB signal limiter 26. The output of the −10 DB signal limiter 26 is connected to the input of the differential amplifier 35. The differential amplifier provides a transmit output for the circuitry of FIG. 3 to which two transmission paths or conductors 10A and 11A are connected. The microcomputer unit 15 is connected to the variable gain and switch circuit 36 and determines the gain setting and when the variable gain and switch circuit 36 will conduct. When the variable gain and switch circuit 36 is operative, signals received at the receive input of the gain stage 16 will be passed to the transmit output of the differential amplifier 35 via the variable gain and switch circuit 36 plus the −10 DB signal limiter 26. The DTMF receiver 17 is connected to interface the DTMF signals it receives from the gain stage 16 to the microcomputer unit 15. The password circuit 18 plus the two dip switches 19, 20 connected to it serve to provide an input to the microcomputer unit to establish a password which must be supplied to the microcomputer unit 15 via the DTMF receiver 17 to gain access for operation of the circuitry in response to commands supplied via the DTMF receiver. The clock circuit 21 provides the clocking for the microcomputer unit 15. The arming circuit 22 and arming switches A1, A2 are used to arm the circuitry and establish which of the trunks connected to the K24 and K25 relays of FIG. 1 will be utilized as a control trunk. The tone generator 23 is operated under the control of the microcomputer unit 15 to provide DTMF signals and signals at various frequencies to the differential amplifier 35 for supply to the transmit output to which the transmission paths 10A and 11A are connected.

The circuitry of FIG. 2 contains two interface circuits, one of which is used to interface the control trunk that is connected to transmission paths 12 and 13 to the transmission paths 12A and 13A which connect to the receive input for the circuitry of FIG. 3 with the other interface circuit being used to interconnect the trunk line to be test that will be connected to the transmission paths 10, 11 to the transmission paths 10A, 11A which connect to the transmit output of the differential amplifier 35. The interface circuit for the control trunk includes a ringing detector circuit 27, a forward disconnect circuit 28, relays K26, K27 and K33 plus a telephone coupling transformer 29. The other interface circuit includes a ringing detector circuit 30, relays K28, K29, K30 and K32 plus a telephone coupling transformer 34. The ringing detector circuit 27 is connected between the transmission paths 12 and 13, while the ringing detector circuit 30 is connected between the transmission paths 10 and 11. An output, indicated as PD4, is provided from each of the ringing detector circuits 27, 30 and is connected to input PD4 of PORT D at the microcomputer unit 15. The forward disconnect circuit 28 is connected in series in transmission path 12 and has its output connected to a normally open contact of relay K26. The forward disconnect circuit 28 has an output, indicated as PD5, which is connected to input PD5 of PORT D of the microcomputer unit 15. The relay K26 has another normally open contact which is connected to the transmission path 13. Relay K26 has two normally closed contacts which are not connected. One winding of the transformer 29 is connected between the two movable contacts of relay K26. When relay K26 is energized current will flow through the one winding of the transformer 29. The other winding of the transformer 29 is connected between the transmission paths 12A and 13A via the relays K27 and K33 when the relays are de-energized. As viewed in FIG. 2, the upper movable contact of relay K33 is connected to one end of the transformer 29 while the other end of the transformer 29 is connected to the lower movable contact for relay K33. The upper movable contact or relay K27 is connected to transmission path 12A while the lower movable contact for relay K27 is connected to the transmission path 13A. Relay K30 is connected between transmission path 11 and ground and must be energized to complete a path from transmission path 11 and ground.

Turning to the other interface circuit shown in FIG. 2, the transmission path 10 is connected to the upper normally open contact of relay K29, while transmission path 11 is connected to the lower normally open contact of relay K29. Relay K29 has two normally closed contacts which are not connected. One winding of transformer 34 is connected between the two movable contact of relay K29. Relays K28 and K32, when de-energized, connect the other winding of transformer 34 between the transmission paths 10A and 11A which connect to the transmit output of the differential amplifier 35. The two movable contacts of relay K32 are connected to the transformer 34 while the two movable contacts of relay K28 are connected to the transmission paths 10A and 11A.

Referring then to relays K32 and K33, the upper normally open contacts of the two relays are connected together while the lower normally open contacts of the two relays are connected together. With this arrangement, the windings of transformers 34 and 29 connected to relays K32 and K33, respectively, are connected together to establish a two-way talk path between a control trunk and a trunk under test when relays K26 and K29 are also energized. Referring to relays K32 and K27, the upper normally closed contact of relay K32 is connected to the upper normally open contact of relay K27 while the lower normally closed contact of relay K32 is connected to the lower normally open contact of relay K27. Referring to relays K28 and K33, the upper normally open contact of relay K28 is connected to the upper normally closed contact of relay K33 while the lower normally open contact of relay K28 is connected to the lower normally closed contact of relay K33. With this arrangement and with both relays K27 and K28 energized, any signals applied to the transmission paths 10, 11, with relay K29 energized, will be transmitted to the receive input at gain stage 16 and with the variable gain and switch circuit 36 conditioned to conduct will be applied via the signal limiter 26 to the differential amplifier 35 and thence via relay K28 to the relay K33 for transmission to the transmission paths 12 and 13 provided relay K26 is energized. Similarly, if the tone generator 23 is operating to provide a signal it will be passed by the differential amplifier 35 and thence via the relay K28 to the transmission paths 12 and 13 provided relay K33 is not energized and relay K26 is energized.

Before giving any consideration to the flow diagrams set forth in the drawing, it is best to first consider the general test functions that are carried out by the test circuitry that has been described in connection with FIGS. 1–3. As has been mentioned earlier, it is the purpose of the test circuitry that has been described, to enable a technician for a service organization that provides service for a PBX to isolate the PBX trunks and carry out various test functions with respect to the telephone company trunk lines by the entry of DTMF commands from a remote telephone of the dial tone type. For example, when the operator of a PBX detects some trouble on one or more trunk lines, the service organization will be called and will be asked to test the trunk lines that are not operating properly to determine whether the problem is with the trunk lines on the telephone company side of the K1–K25 relays. If the call made by the operator to the service organization is made on either trunk line connected to relay K24 or to K25 the operator only has to move the arming switch A1 to the on position and then to the off position if the call was made via the trunk line for relay K25, or operate arming switch A2 to the on position and then to the off position if the call was made via the trunk line for relay K24 to enable the service technician to the proceed. When the particular arming switch is operated to the off position relay K26 is energized and relay K31 will remain in the de-energized position, if arming switch A1 has been operated, but will be energized in the event that arming switch A2 has been operated. Assuming arming switch A1 has been operated as described, the trunk line for relay K25 will then be connected as the control trunk to transmission paths 12 and 13, relay K26 will be actuated to "seize" the control trunk and for a short time relays K27 and K28 will be actuated during which time a signal provided by the tone generator 33 is transmitted to the service person via the control trunk to indicate that the password should be sent to allow transmission of DTMF commands to the microcomputer unit 15. Alternate ways for getting to the point where the password is required will be considered when the routine flow diagrams of the drawing relating to CHK5, CHK6, MONA 1, MONA 2 and MON are discussed. The technician will send DTMF signals for the password by operation of the proper keys on the telephone keyboard which will then enable him to enter various DTMF commands via the operation of predetermined keys on the telephone keyboard. Normally the first command that will be sent by the technician via the control trunk to the microcomputer unit 15 will be for the purpose of activating the relay for a selected trunk line to be tested, which is designated with the command, to cause the trunk line to be tested (TUT) to be disconnected (isolated) from the PBX and connected to transmission paths 10 and 11 which in turn are connected to the transformer 34 via relay K29, which is actuated, to cause a dial tone from the telephone central office to be placed on the TUT. The command also causes relays K27 and K28 to be operated so that the dial tone is passed to the receive input at gain stage 16 and thence to the transmit output at differential amplifier 35 for passage to the control trunk via transformer 29 and the transmission paths 12 and 13. The dial tone can then be heard by the service technician. The command causes this dial tone to be only heard for a limited period of time. Upon termination of the time period, relays K27, K28 and K29 are de-energized. The operation just described will be considered in more detail when the LOOPST (loop start) and GRNDST (ground start) routine flow diagrams are discussed.

Another desirable test arrangement that can be set up via a command sent from the technician's telephone to the microcomputer unit 15, is one which allows a determination to be made as to whether a call placed on the trunk under test (TUT) can be answered. This requires that the technician have another telephone instrument available for use and the technician must know the telephone number by which the TUT can be reached. As for all commands, the command for such type of testing is entered by the technician using the telephone keyboard for the telephone that has been connected to the test circuitry via the control trunk line. The command can relate to a trunk line which was previously specified or can include information regarding a particular TUT to be connected and cause the TUT indicated by the command to be connected to transmission paths 10 and 11. The command will also cause relays K27 and K28 to be operated and provide a short time period for the technician to call the telephone number by which the trunk under test (TUT) can be reached. When the call is completed to the TUT, the ringing detector circuit 30 will detect the ringing signal and, for the first two ringing signals, a signal will be provided to the microcomputer unit 15 via the connection between the ringing detector circuit 30 and input PD4 of PORT D of the microcomputer unit 15. Under the control ff the microcomputer unit 15, the tone generator 23 provides a signal of a particular frequency for each of the first two ringing signals which is transmitted via the differential amplifier 35, relay K28, and transformer 29 and to the technician's telephone via the control trunk to indicate to the technician that the TUT has been reached and has transmitted ringing signals to the test circuitry. After two ringing signals have been detected, relay K29 is energized to "seize" the TUT, relays K27 and K28 are de-energized and the variable gain and switch circuit 36 is opened. The test arrangement just discussed will be considered in more detail when the ANSTUT (answer test) routine flow diagram is discussed.

With the arrangement just described, wherein the technician has one telephone connected to the test circuitry via the control trunk and another telephone connected via a TUT, it is possible to carry out some further testing with respect to the TUT. Such testing need not be carried out in the order in which they are discussed. One such test involves the transmission of a command from the control trunk telephone to the microcomputer unit 15 that causes the microcomputer to set the variable gain and switch circuit 36 to provide a zero gain and then provide a limited time period before breaking the path between the receive input and the transmit output path at the variable gain and switch circuit 36. During the limited time period that is provided, it is possible to transmit from the far end of the control trunk via the circuitry between the receive input at the gain stage 16 and the transmit output at the differential amplifier 35 to the telephone at the far end of the TUT. The test arrangement just discussed will be considered in more detail when the XMITUT (transmit to TUT) routine flow diagram is discussed.

Another test arrangement that can be set up and utilized at this time, provides for transmission from the far end of the TUT to the gain stage 16 and thence to the differential amplifier 35 via the variable gain and switch circuit 36 plus the −10 DB signal limiter 26 and thence to the telephone at the far end of hhe control technician is located. This requires the transmission of a command to the microcomputer unit 15 which causes relays K27 and K28 to be energized for a limited period of time. Upon completion of the limited period of time the path via the variable gain and switch circuit 36 is broken and the relays K27 and K28 are de-energized. It is also possible for the command to include an indication for the gain level to be provided by the variable gain and switch circuit 36 during the time that relays K27 and K28 are energized. The test arrangement just discussed will be considered in more detail when the LISTEN (listen to TUT) routine flow diagram is discussed.

A further test configuration can be carried out by transmitting another command to the microcomputer unit 15 which is effective to activate relays K32 and K33 for a short period of time. With this arrangement a two-way transmission path is provided between the far end of the TUT and the control trunk since the operation of relays K32 and K33 connects the two transformers 29 and 34 directly together. Upon completion of the limited time period, the relays K32 and K33 are de-energized. The test arrangement just discussed will be considered in more detail when the TALK (two-way talk path) routine flow diagram is discussed.

Another test configuration can be carried out by transmitting another command to the microcomputer unit 15 which is effective to cause the tone generator to provide a 1,004 HZ tone at −10 DB milliwatt to the TUT, with such tone being provided for a limited period of time at a milliwatt level. In this situation, relay K28 is de-activated. The test arrangement just discussed will be considered in more detail when the MWTUT (milliwatt tone to TUT) routine flow diagram is discussed.

When the technician has completed entry of the tests to be performed after using the command that provides connection of a telephone at the control trunk plus the connection of a telephone to the far end of the TUT, the technician will normally enter a command that is effective to cause the microcomputer unit 15 to hang up the TUT, i.e., de-activate relay K29. The processing that takes place when this command is used is set forth in the ONHKTUT (on hook TUT) routine flow diagram that will be discussed later.

The microcomputer unit 15 is also programmed to respond to a command with which a telephone number is designated which will be called using the TUT that is then connected to the transmission paths 10, 11 and provided the relay K29 is de-energized. The call will be made using either DTMF signals or pulse dialing, whichever may be required. If the command calls for pulse dialing, the relay K29 is de-energized and then energized as many times as is required for each digit in the telephone number to be dialed. In the event the call is to be made using DTMF tones, the DTMF tones are provided for each digit of the telephone number to be called as specified by the command by the operation of the tone generator 23 under the control of the microcomputer unit 15. Once the call has been completed, relays K32 and K33 are operated for a short period of time to provide a two-way talk path between the telephone at the far end of the control trunk and the telephone at the far end of the TUT which was called. Any telephone can be called and can be a telephone located where the technician is located which would then enable the technician to carry out the tests that have been described following the use of the answer TUT command wherein a call was made to the TUT connected to the transmission paths 10, 11 using a telephone at the location of the technician. When the technician has completed entry of the tests to be done after the technician has used the command that allows a telephone number to be called via the TUT, the technician will normally enter the ONHKTUT (on hook TUT) command which is effective to hang up the TUT, i.e., de-activate relay 229. The calling test arrangement just discussed will be considered in more detail when the DIALPUL (dial pulse) and DLTONE (dial tone) routine flow diagram is discussed.

Another test arrangement that can be carried out any time that the technician can enter a command using a telephone connected to the control trunk provides for the transmission of a milliwatt tone at 1,004 HZ at −10 DB milliwatt for a limited period of time to the technician's telephone via the control trunk. Upon entry of the command for this test, the microcomputer unit 15 causes relays K27 and K28 to be actuated which serves to connect the control trunk via the relay K26, transformer 29, relay K33 and relay K28 wiich connects to the transmit output of the differential amplifier 35 which receives the tone from tone generator 23. Tone generator 23 is, of course, controlled by the microcomputer unit 15 to operate for providing the 1,004 HZ tone. This test arrangement will be considered in more detail when the MWCNTL (milliwatt control) routine flow diagram is discussed.

It has been found that there are times when a problem that is believed to be associated with a particular trunk can be corrected by merely disconnecting the trunk from the PBX for a predetermined length of time and then reconnecting it to the PBX. The command for carrying out this function will designate the trunk number to be so manipulated with such trunk number being any trunk except the trunk used as a control trunk. A trunk number corresponds to the relay number of relays K1-K25 to which it is connected. Thus, for example, trunk number "20" is the trunk line connected to relay K20. Entry of the command by the technician causes the microcomputer unit 15 to provide the relay driver 14 with the necessary input to activate the relay for the trun number designated by the command and then provide a short time delay before de-activating the relay. This function will be considered in more detail when the ISOTRK (isolate trunk) routine flow diagram is considered.

The first test arrangement that was discussed provided for the designation of a particular trunk as the test trunk with the relay connected to such TUT operated to disconnect (isolate) the trunk from the BBX and connect it to transmission paths 10 and 11 and then by operation of relay K29 connect the test trunk to the transformer 34. Such test provided for the actuation of relays K27 and K28 so the dial tone which was presented on the TUT upon actuation of relay K29 would be applied to the receive input at gain stage 16 and then passed to the differential amplifier 35 for passage to the control trunk and to the telephone connected to the far end of the control trunk where the dial tone would be heard by the service technician. Relay K29 was then de-energized after a short period of time to terminate the dial tone. Another command is available which will provide for such a dial tone check for every trunk beginning with the trunk number designated in the command, including the trunk associated with relay K25 unless it is the control trunk. The arrangement provided by such command requires the technician, upon hearing the first dial tone, to transmit any DTMF tone by operation of any key on the control trunk telephone, except the # key, which cause the connected TUT relay to be de-activated and the next higher numbered relay to be activated, with such operation being repeated each time the technician hears a dial tone or until the # key is entered. After all desired trunks have been connected and tested for a dial tone, the microcomputer unit 15 causes relay K29 to be de-activated. This scan for dial tone operation that has been described will be considered in more detail when the SCANTRK (scan trunk) routine flow diagram of the drawing is discussed.

Further details regarding the circuitry shown in FIGS. 1-3 will be provided before considering the routine flow diagrams relating to operation of the circuitry for various command inputs. An MC68705U3 microcomputer unit (MCU) available from the Motorola Company of Schaumburg, Ill. is suitable for use as the microcomputer unit (MUU) 15. The MCU 15 has a 8-bit architecture, two 8-bit registers (A and X), an 8-bit status register, a 12-bit program counter, 112 bytes of RAM, 3776 bytes of user programmable EPROM, 24 bidirectional input/output (I/O) lines, and 8 digital input lines. An external 3.579545 MHZ clock oscillator circuit can be used as the clock circuit 21 to insure reliable operation used for the dual tone multiple frequency (DTMF) receiver 17.

The DTMF receiver 17 is interfaced to the MCU 15 using five of the eight digital input lines. The eight digital input lines are configured as PORT D (PD) on the MCU 15. PD0, PD1, PD2, and PD3 are used to receive the 4-bit hex code from the DTMF receiver 17. PD0 is the least significant bit. PD6 is used to monitor the data valid (DV) signal from the DTMF receiver 17. The DV signal presents a high logic level when a valid tone pair has been received. After a high level is detected on PD6, the MCU then reads the data at PORT D, masks off the upper four bits, and interprets the lower four remaining bits as DTMF data.

The tone generator 23 includes an 8-bit digital-to-analog converter (D/A) and a second order low pass filter. The tone generator 23 is interfaced to the MCU 15 using all eight bits of PORT B (PB) which connect directly to the digital-to-analog (D/A) converter. The 8-bit (D/A) converter has its own internal reference voltage and two voltage output ranges. The lower of the two ranges, 0 to 2.56 volts, is used. PB0 is the least significant bit of PORT B and it is connected to the least significant bit of the D/A. The higher order bits are connected in like fashion. Any data written to PORT B is immediately read by the D/A. Immediately after the MCU 15 is reset, hex 7F is written to the D/A so it will be at one-half its range to start. The output of the D/A is fed directly into the second order low pass filter. The filter is designed to have a break point of 2,500 HZ. The output of the low pass filter is then AC coupled to the differential amplifier 35 that is designed to generate a −10 DB signal into a 900 ohm load.

The relay driver 14 is a 32-bit serial-input, latched driver. The relay driver 14 supplies ground to the relays of the circuitr of FIGS. 1-3 to activate them. The least significant four bits of PORT A is used to interface the MCU 15 to the relay driver 14. PA0 is the data bit, PA1 is the clock bit, PA2 is the strobe bit, and PA3 is the output enable bit. The MCU 15 sets PA0 according to the data, and then pulses PA1 to send the data to the relay driver 14. After all 32 bits of data have been transmitted to the relay driver 14, a high level on PA2 will latch the data into the relay driver's data latches. A high level on PA3 will then activate the outputs of the relay driver 14.

The password dip switches 19 and 20 are also serially interfaced to the MCU 15. The password circuit 18 includes two parallel in/serial out shift registers which are interfaced directly to the dip switches 19, 20. One side of each switch is connected to ground, the other side is tied to a 100K "pullup" resistor which is tied to +5 volts. When the switch is open it reads as a logic 1 or high level and when the switch is closed it reads as a logic 0 or low level. These levels are latched into the shift register by a low level on PORT C bit 2 (PC2). They may then be shifted back to the MCU 15 by a high level on PC2 and a rising edge on PC3 as a clock. The data is read on PC7 by the MCU 15 to determine what the password is. The data is shifted to the MCU 15 least significant bit first and then stored in RAM. Because the shift registers are HCMOS and the MCU 15 is HMOS, 100K "pullup" resistors are used on PC2 and PC3 to achieve the logic level recognized by HCMOS devices as a high level.

Each of the password dip switches 19,20 has eight rocker switches, the positions of which determine the password that must be used to gain access to the test circuitry, as will be explained. The password is a four digit number and can be any combination of numbers from 0-9. The 16 rocker switches are divided into four sets of four. A binary numbering scheme, where four binary digits equal a single decimal digit, is used. The first four rocker witches of switch 19 represent the first number of the password and the second four represent the second number. The first four rocker switches of switch 20 represent the third number and the second four represent the fourth number. Each of the 16 rocker switches can be set to either open or close. An open switch is seen as a logic 1 and a closed switch is seen as a logic 0. If all 16 rocker switches are closed, they are seen as four sets of four zeros, and each set of four zeros is seen as one decimal digit. Therefore, the password would be 0000. Each decimal of the password is expressed in binary form by the rocker switch settings. As an example, assume the password 7039 is to be used. For the number 7, rocker switches 5 through 8 of switch 19 would be set to 0111 (rocker switch 1 would be closed and switches 5, 6 and 7 would be open). For the number 0, rocker switches 1 through 4 of switch 19 would be set to 0000 (all switches would be closed). For the number 3, rocker switches 5 through 8 of switch 20 would be set to 0011 (switches 7 and 8 would be closed and 5 and 6 would be open). For the number 9, rocker switches 1 through 4 of switch 20 would be set to 1001 (switches 1 and 4 would be open and 3 and 4 would be closed).

The arming switches A1 and A2 are of the push-on/push-off type having mechanical indicators that show the operating position for the switches. The function of the arming circuit 22 is to generate a clean reset pulse to the reset input 9 of the MCU 15 when one of the switches A1, A2 is pushed to the "on" position and supply a high logic level to PC5 of the MCU 15 when arming switch A1 is pushed to the "on" position or to PC6 when arming switch A2 is so operated. The arming circuit 22 includes two arming circuits, one for each of the two arming switches, with each having an RC filter with a long time constant to prevent noise from accidentally triggering a reset signal for the MCU 15. A Schmitt-trigger inverter follows each filter to generate a clean digital signal. The MCU 15 monitors PC5 and PC6 to determine which, if any, of arming switches A1, A2 is the source for the reset signal. The digital signal is also then fed into a precision multivibrator to generate a reset signal. The output of each precision multivibrator is then fed into a three input NAND gate, along with a power-on-reset (POR) signal. The POR signal is created using an RC time delay trigger by the power supply and then fed into two Schmitt-trigger inverters. As stated earlier, the POR and the two arming button signals are then fed into a three input NAND gate so that a low level on any of the three inputs will generate a high level on the NAND gate output. This signal is then inverted using a Schmitt-trigger inverter and connected to the reset input 9 of the MCU 15.

The ringing detector circuits 27 and 30 are identical with each having a ringing detect integrated circuit (IC) and an opto-isolator which isolates the digital circuits from the telephone trunk line. When ringing voltage is present, the ringing detect IC rectifies the AC ringing voltage and generates a regulated five volt output. This five volt output then powers an opto-isolator IC which gnnerates a low level on PC4 (PORT C bit 4) which is monitored by the MCU 15. When there is no ringing, voltage PC4 is maintained at a high level by a 100K "pullup" resistor tied to five volts.

The forward disconnect circuit 28 includes a diode rectifier circuit, a bypass capacitor, a Zener diode, a small resistor, and an opto-isolator to detect current flow. The rectifier circuit allows current to pass through the opto-isolator in only one direction. The Zener diode limits the amount of voltage that appears across the small resistor to limit the amount of current that passes through the opto-isolator. When there is a DC loop current present, a small current flows through the opto-isolator turning it on and causing a low level signal to appear on either PD5 for the tuunks or PD4 for the test trunks. When there is no DC loop current, the level on these pins is maintained at a high level by 100K "pullup" resistors tied to five volts.

The differential amplifier 35 includes two unit gain inverting amplifiers. The variable gain and switch circuit 36 includes an inverting amplifier and an analog switch integrated circuit that switches the input resistors to change the gain to 0, 10 or 20 DB gain. PA5, PA6, and PA7 of PORT A of the MCU 15 are used to select the gain. The analog switch is also used to break the path (open circuit) between the receive input at gain stage 16 and the transmit output at the differential amplifier 35. The output of the variable gain and switch circuit 36 is fed to a precision bridge-type amplitude-limiter circuit 26. The signal limiter circuit 26 includes a diode bridge an two resistors, one resistor tied to a special reference voltage and the other to ground. The amplitude-limiter circuit 26 is used to insure that no signal greater than −10 DB can be transmitted. The output of the signal limiter circuit 26 is AC coupled to the differential amplifier 35.

The operation of the test circuitry shown in FIGS. 1–3 will now be described in connection with the procedures illustrated in the flow diagrams of FIGS. 5–8. The flow diagrams shown in FIGS. 5–8 illustrate the procedure and operation of the circuitry of FIGS. 1–3 for establishing the control trunk line to be used and for establishing telephone communication from the far end of the control trunk to the MCU 15 so that DTMF signal commands for establishing variousttest arrangements can be entered from a dial tone type telephone at the far end of the control trunk. It should be recognized that although the procedure to be described requires entry of a password using DTMF signals before any test commands can be entered, such required password entry could be eliminated, if desired, from the procedure.

Figure 30:
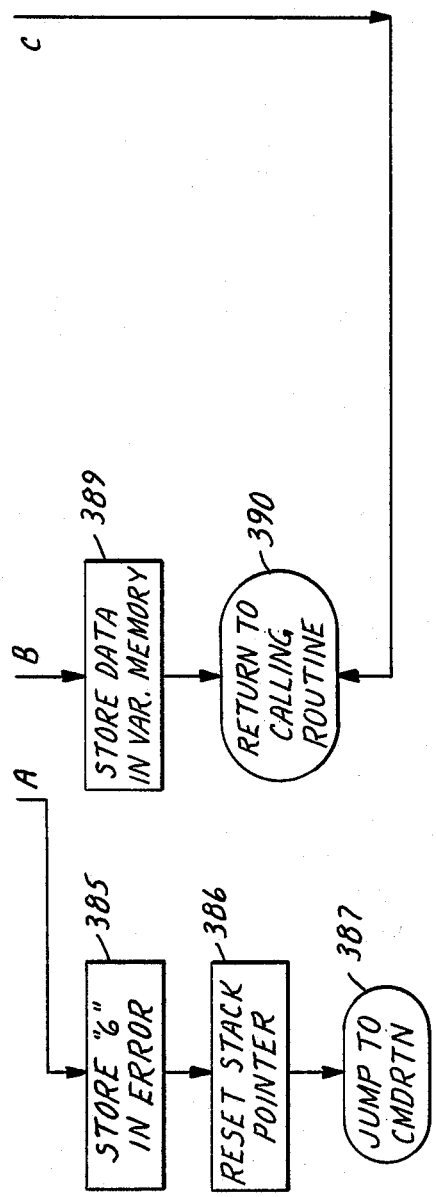

As has been mentioned earlier, the MCU 15 can be reset by operating either of the arming switches A1, A2 to the "on" position or by providing power to the MCU 15. The procedure illustrated by the flow diagram of FIG. 5 comes into play after the MCU 15 has been reset. The routine relates to the checking of bit 5 of PORT C of the MCU 15 and as indicated at 40, and checking of the bit 5 of the PORT C as indicated at 41. As has been mentioned earlier, bit 5 of PORT C will have a high signal presented to it when arming switch A1 has been moved to the "on" position, while PORT C6 will have a high signal presented to it when arming switch A2 has been moved to the "on" position. As indicated at 42, the routine calls for a check of bit 5 of PORT C to determine whether it is equal to 1. If it is found to be equal to 1, this means that the arming switch A1 has been moved to the "on" position. If this is the case, the MCU 15 then functions to set the control variable in the MCU 15 to 25, as indicated at 43, ad then causes relay K31 to be placed in a de-activated position as indicated at 44 which means the trunk connected to relay K25 is connected as the control trunk. A jump is then made to the monitor A1 routine as indicated at 45. The monitor A1 routine is shown in FIG. 6 of the drawing. If the check made at 42 determines that bit 5 of PORT C was low or a zero, the routine then takes up a check of bit 6 of PORT C as indicated at 41, and, as indicated at 46, the MCU looks oo see whether bit 6 of PORT C is equal to 1 or high. If bit 6 of PORT C is found to be high, this means that arming switch A2 has been moved to the "on" position. This being the case, MCU15 sets the control variable to 24, as indicated at 47. The MCU 15 has thus stored information indicating that the trunk line connected to relay K24 is the control trunk. The MCU 15 then causes relay K31 to be actuated, as indicated at 48, causing the trunk line connected to relay K24 to be connected to the communication pair 12, 13. As indicated at 49, the routine then jumps to the monitor arming switch A2 routine of FIG. 6. If a check of bit 6 of PORT C showed a low or zero to be present, a jump would be made to the ring 12 as indicated at 50. The ring 12 routine is shown in FIG. 30 of the drawing and will be discussed later.

Assuming arming switch A1 had been operated to the "on" position resulting in the selection of the trunk line connected to K25 as the control trunk, the monitor A1 routine would be entered at 51. The routine at 52 then raises a question as to whether the control trunk should be seized at this time, i.e., should relay K26 be operated? This query is answered "yes" if the arming switch A1 has been moved from the "on" to the "off" position causing the MCU 15 to actuate relay K26 as indicated at 53. The operator of the PBX would have moved the arming switch A1 from the "on" to the "off" position in the event the operator had called the service technician for the PBX via the control trunk that is connected to relay K25; or in the event the service technician had called in on the trunk that is connected to K25 and requested that arming switch A1 be operated to the "on" positoon and then to the "off" position to establish trunk 25 as the control trunk. Another situation may arise where the communication between the operator and the service technician is via a trunk line other than trunk 25 and the decisio is made to have the technician to test some of the trunk lines and it is decided that the control trunk 25 will be used as a control trunk. The PBX operator will then actuate the arming switch A1 to the "on" position and the technician will then have one minute to make a call to the control trunk which is connected to relay K25. With this situation, the question raised at 52 as to whether arming switch A1 has been moved from the "on" to the "off" position would be answered in the negative. As indicated at 54, the MCU 15 then monitors the bit PD4 of PORT D which is connected to the ringing detector circuit 27 to determine whether the ringing detector circuit 27 has detected any ringing. If ringing is detected due to the technician placing a call to the trunk which is connected to relay K25, the relay K26 will be activated by the MCU 15 as indicated at 53 to "seize" or take the control trunk off hook. In the event no ringing is detected at 54 of the routine, a determination is made at 55 as to whether the one minute provided for the technician to make a call to the trunk which is connected to relay K25 has expired. If it has expired, the routine jumps to the disconnect control (DISCNTL) routine as indicated at 56; or, if the time has not expired, the routine returns to the beginning of the monitor A1 routine at 51. The disconnect routine is set forth in FIG. 27 of the drawing. If the routine has reached the point 53 where relay K26 is actuated, the routine jumps to the monitor (MON) routine as indicated at 57. The monitor routine is set forth in FIGS. 7–8.

Figure 5:
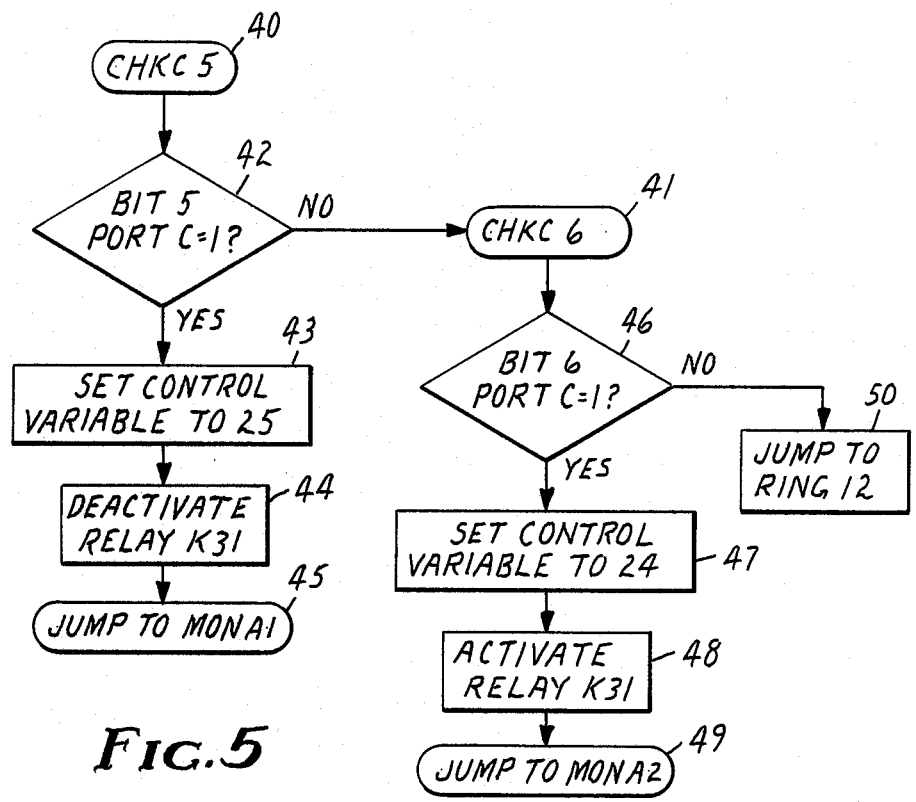
Figure 6:
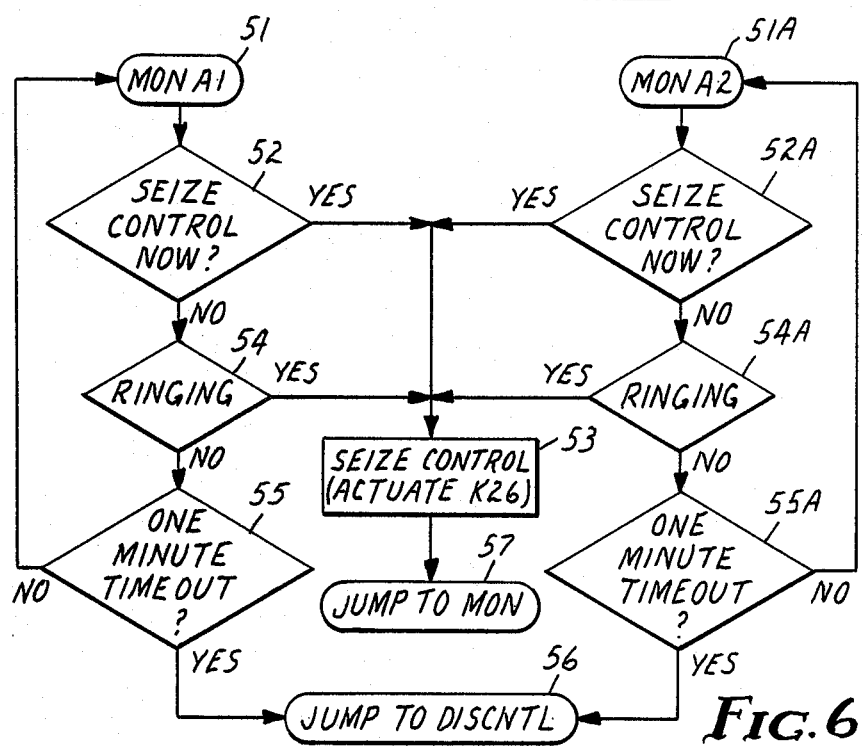

Referring to the monitor A2 routine of FIG. 6, this routine is entered into from the routine of FIG. 5 if arming switch A2 was moved to the "on" position and is entered at 51A. The actions at 52A, 54A, and 55A of the monitor A2 routine correspond to the actions at 52, 54 and 55 as just described, except that the trunk line which is connected to the relay K24 is involved in the monitor A2 routine.

Figure 9:
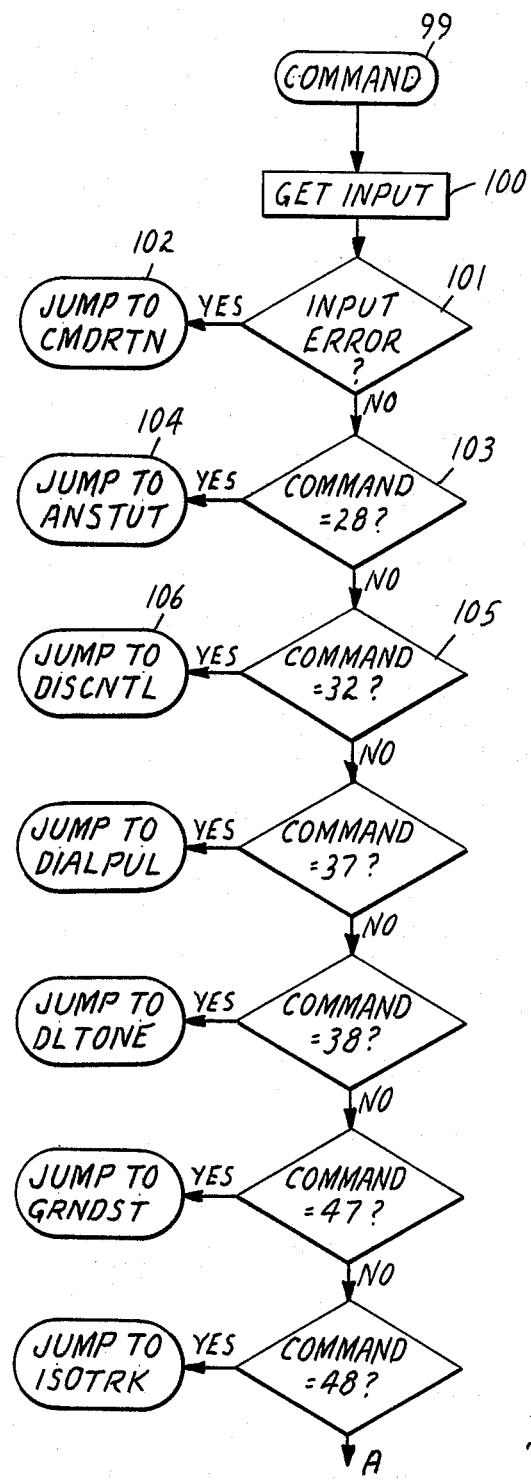
Figure 24:
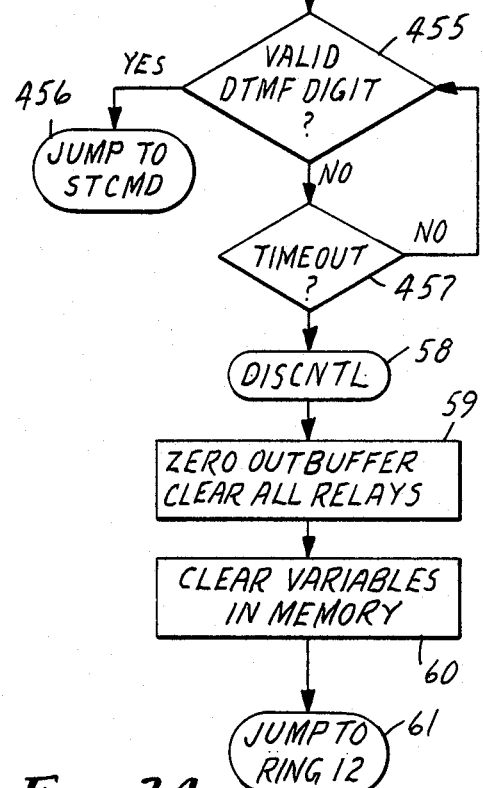

Before considering the monitor (MON) routine, it would be best to discuss the disconnect control routine (DISCNTL) since it will appear from time to time in connection with other routines to be considered. Further, the disconnect control routine is one that can be entered as a command. Referring to FIG. 9, the number for the command is "32" so, as will be explained later, the entry for the command would be *32 #. This routine would be used after all tests to be done are completed. The disconnect control routine is soown in FIG. 24 and appears near the bottom of the figure. Entry to the routine is made at 58 and at 59 the out buffer of the MCU 15 is zeroed and all relays are cleared, i.e., de-activated. As indicated at 60, the MCU 15 then clears all variables in memory and a jump is made to the ring 12 routine, as indicated at 61.

Figure 7:
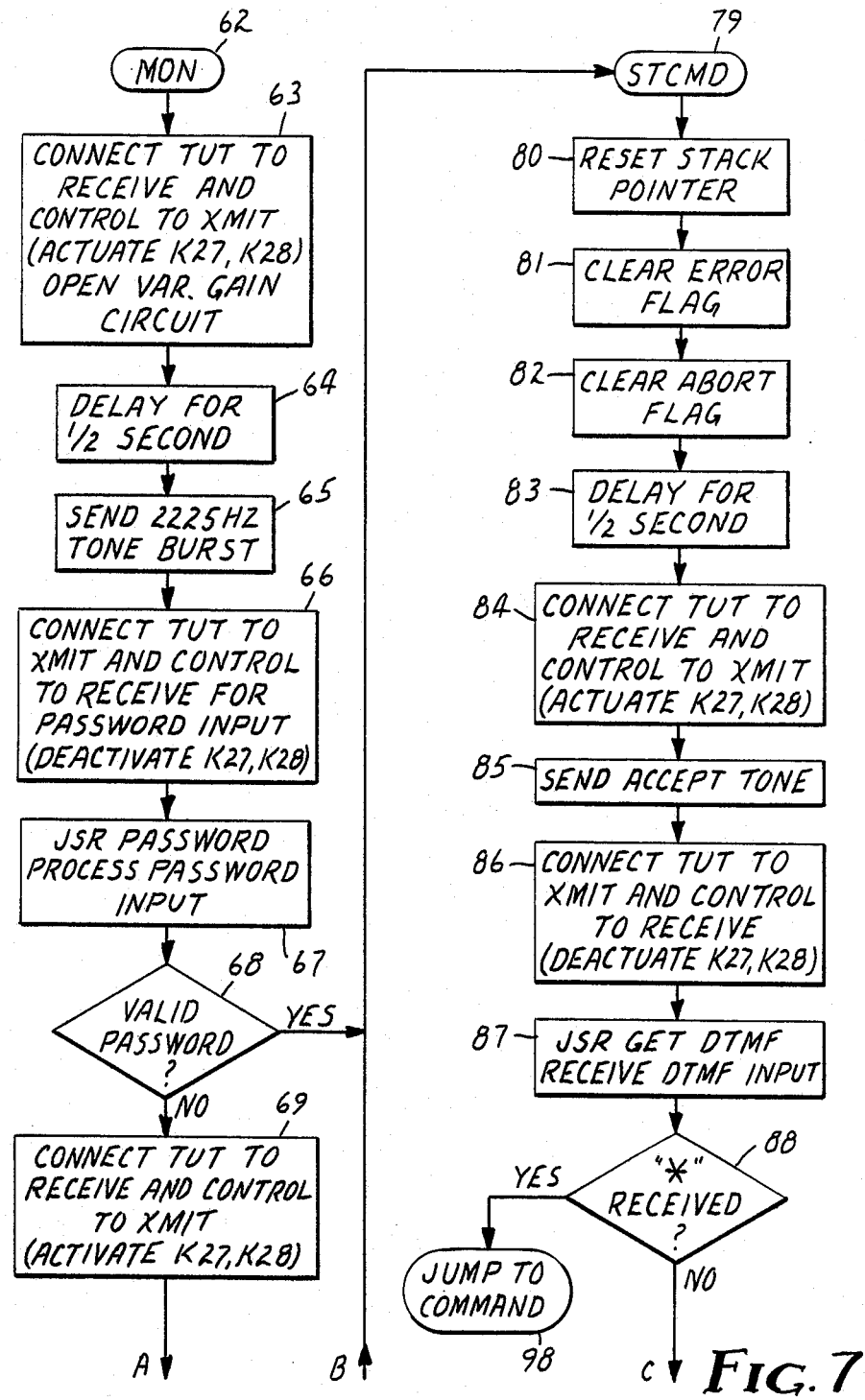
Figure 8:
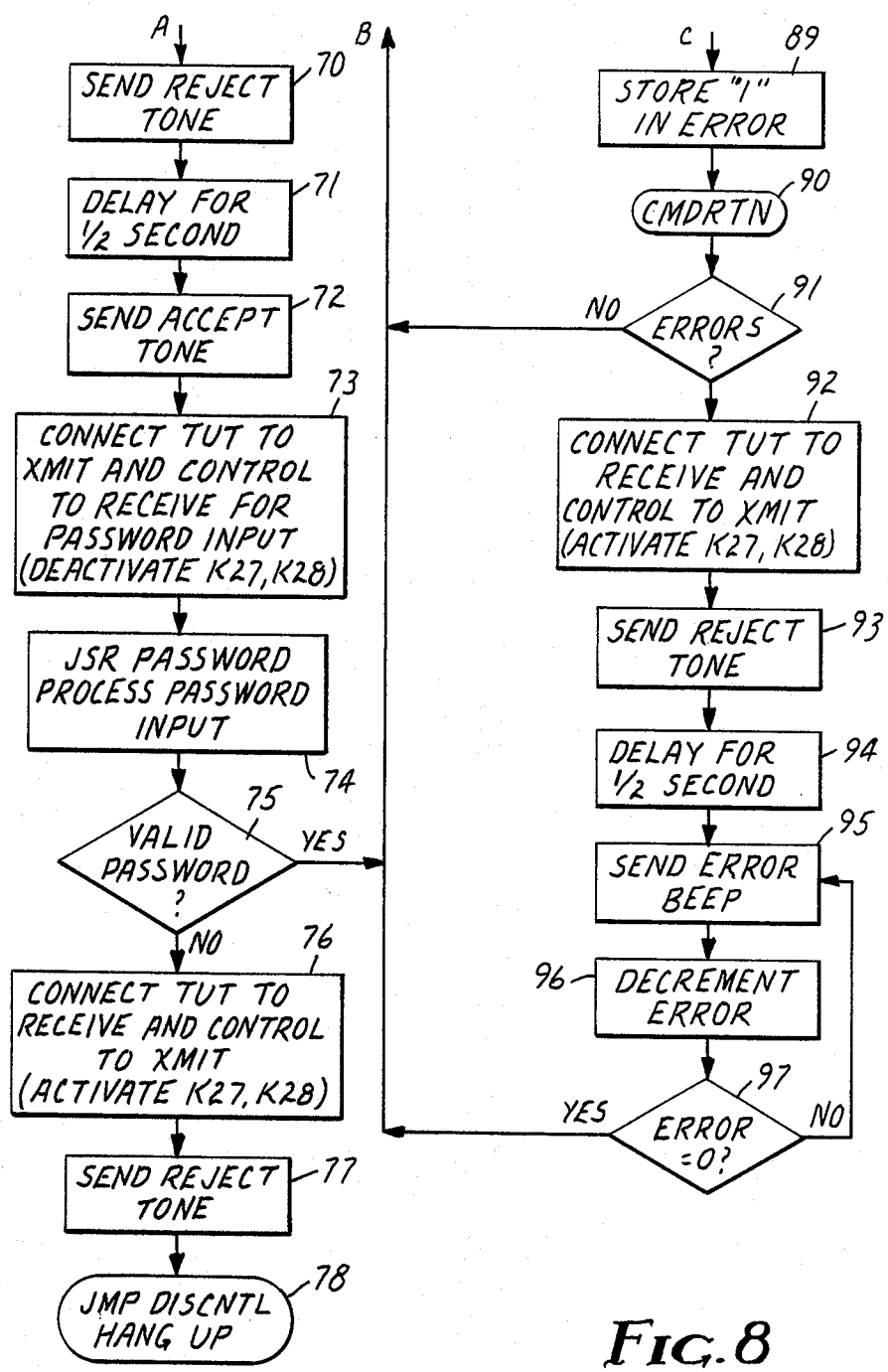

Turning to the monitor (MON) routine which is shown in FIGS. 7 and 8, FIG. 8 can be positioned directly below FIG. 7 to provide a single view of the monitor and related routines. The monitor routine is entered at 62 with the MCU 15 causing relays K27 and K28 to be actuated and the variable gain and switch circuit 36 to be opened, as indicated at 63. With relay K28 actuated, the transmit output of the differential amplifier 35 is connected to the telephone coupling transformer 29 so that any output from the differential amplifier 35 is transmitted to the technician's telephone at the far end of the control trunk that is utilized. The routine provides for a delay of about one-half second, as indicated at 64, before a tone burst at 2,225 HZ is transmitted. The tone burst is provided by the tone generator 23 under the control of the MCU 15 and is applied to the differential amplifier 35 where it is transmitted to the technician at the far end of the control trunk. The tone at this frequency serves to inform the technician that the password for the test equipment can be sent. After the tone burst has been sent, as indicated at 65, the MCU 15 de-activates relays K27 and K28 so that a password input entered by the actuation of the keyboard of the telephone at the far end of the control trunk will be received at the receive input of the gain stage 16 of FIG. 3 and pass to the DTMF receiver 17. The next step 67 of the routine involves a jump to the password subroutine which is set forth in FIG. 28 of the drawing. A description of the password routine will not be provided at this time. As has been indicated earlier, the password consists of four digits which are entered in binary form using the switches 19 and 20 of FIG. 3. The technician will enter the password after he has received the 2,225 HZ tone burst which will be examined by the password routine as indicated at 67. An indication will be provided at 68 as to whether the password is valid. If the password that was sent is not correct, the MCU 15 causes the relays K27 and K28 to be actuated as indicated at 69 so that a reject tone can be sent to the telephone at the far end of the control trunk. The reject tone is a warble tone made up of a 480 and a 620 HZ signal. This reject signal is also produced by the tone generator 23 under the control of the MCU 15 and is transmitted via the differential amplifier 35 to the telephone at the far end of the control trunk. This informs the technician that he has made an error in entering the password. A delay of about one-half second is provided as indicated at 71 and is followed by the transmission of an accept tone, as indicated at 72. The accept tone consists of three beeps at a frequency of 480 HZ. The accept tone also is provided by the tone generator 23 under the control of the MCU 15. The accept tone that is sent serves to indicate to the technician that another attempt can be made to provide the proper password. After the accept tone is sent, relays K27 and K28 are de-activated, so any password that is entered on the keyboard of the telephone at the far end of the control trunk will be received at the gain stage 16 and be passed to the MCU 15 via the DTMF receiver 17. This action is indicated at 73. As indicated at 74, the routine then jumps to the password routine where the password input is processed. As indicated at 75, if the password was not found to be valid the routine then provides for the actuation of relays K27 and K28 at 76 followed by the transmission of another reject tone at 77. After the reject tone has been sent, the routine then jumps to the disconnect control routine, as indicated at 78. If the first password attempt had been a valid password or if the second password entered had been correct, the routine would go to the start comaand routine, the entry of which is indicated at 79 at the top of FIG. 7. The MCU 15 then resets the stack pointer at 80, clears the error flag at 81 and the abort flag at 82. A delay of one-half second is provided by the MCU 15 as indicated at 83 followed by the actuation of relays K27 and K28 at 84. A three-beep accept tone sent as indicated at 85 followed by de-activation of relays K27 and K28 as indicated at 86. The accept tone sent at point 85 of the routine is heard by the technician and serves to inform the technician that a command can be sent to the MCU to establish any of the various test arrangements that are available.

A particular DTMF signal is used to identify a start of a command with another distinct DTMF signal used to indicate the end of a command. The star (*) input key on the telephone keyboard is used to provide the DTMF signal indicating the start of a command, while the DTMF signal associated with the # key is used to indicate the end of a command signal. The first two DTMF inputs following the * input identify the command and may be followed by several other DTMF signals dependent upon the command that is utilized. The input following the two DDTMF signals identifying the command are referred to as parameters.

Figure 32:
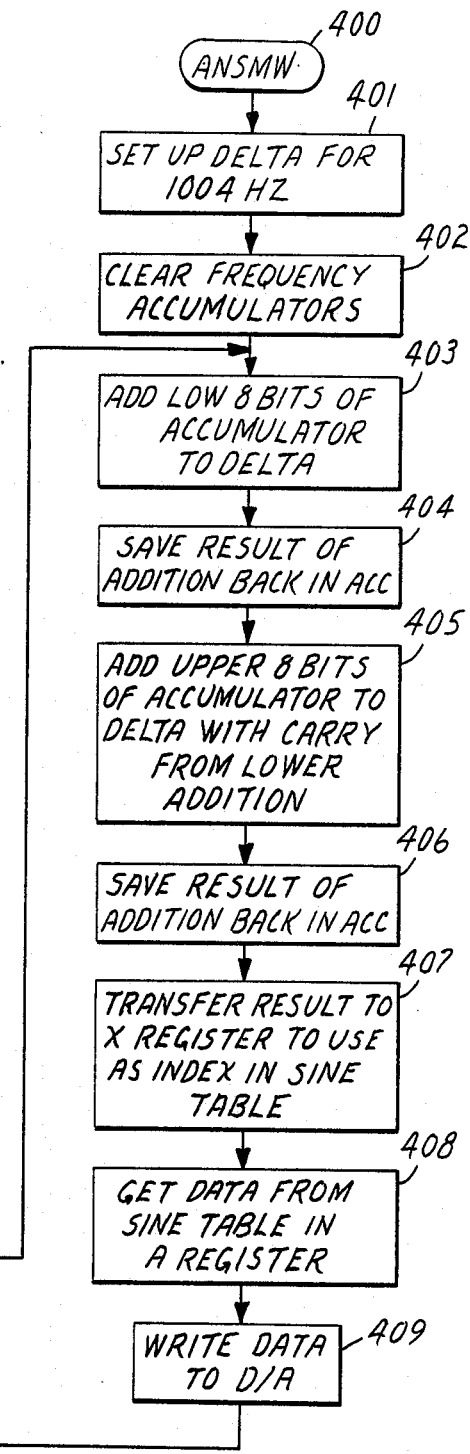

Returning to the routine of FIG. 7, a jump is made to the GET DTMF routine as indicated at 87. The GET DTMF routine is set forth in FIGS. 32 and 33, but will not be discussed at this time, except to indicate that it processes the DTMF signals that have been sent from the far end of the control trunk to the MCU 15 and places them in memory. As indicated at 88, a determination is made as to whether a DTMF signal for a * entry has been received. If the answer is "yes", this would indicate that the DTMF signal should be considered a command so a jump is made to the command routine, as indicated at 98. If a * signal entry were not the first input received, a "1" would be placed in the error memory, as indicated at 89, with the routine then proceeding to the command return (CMDRTN) routine where its entry is indicated at 90. The command return routine then proceeds to point 91 in the routine where a determination is made as to whether any errors are stored. In this case, of course, an error has been stored so the routine would proceed to 92 in the routine. If no errors were found to be present, the command routine would be exited and the start command (STCMD) routine at the top of FIG. 7 would be entered. Proceeding with step 92 of the routine following a determination that an error was present, the MCU 15 causes relays K27 and K28 to be activated. The MCU 15 then causes the tone generator 23 to supply a reject tone to the differential amplifier 35 which is then sent to the telephone at the far end of the control trunk. This serves to inform the technician that the entry that he had made was not accepted. Following the sending of the reject tone, a delay of a half second is provided as indicated at 94 which is then followed with an error signal at 95 which consists of a single beep at 2,225 HZ. The error is decremented at 96 and a determination is made at 97 as to whether the error is zero. If the error were not zero, the routine would return to the point at 95 where another error beep would be sent. If the error is zero, the routine returns to the start command routine which is entered at 79 at the top of FIG. 7. This enables the technician to again attempt to send a command to the MCU 15.

Figure 10:
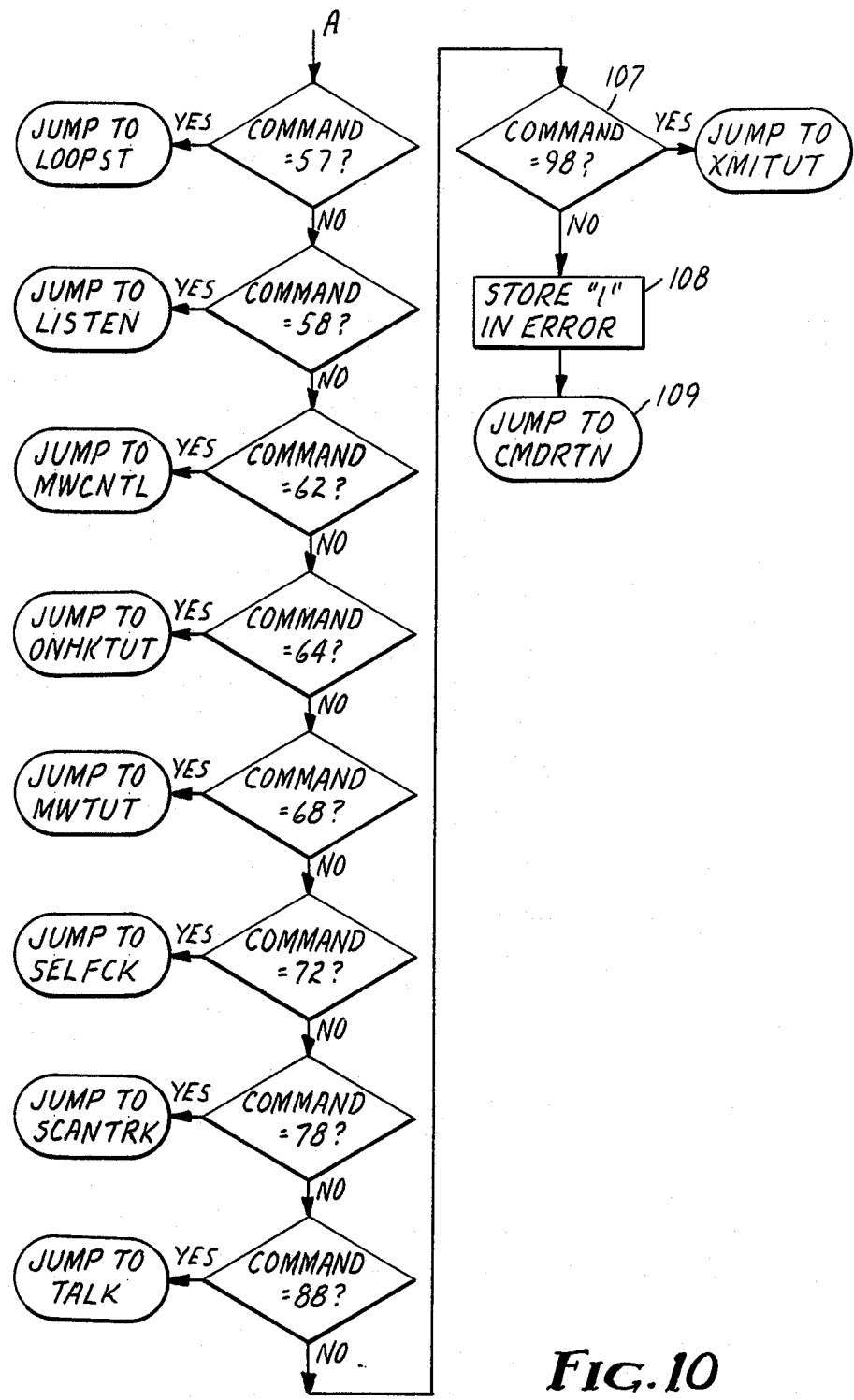

Referring to the command routine at FIGS. 9 and 10, the entire diagram for the routine can be seen if FIG. 9 is positioned above FIG. 10. The command routine is entered at 99 and the command input provided by the entry made by the technician is obtained as indicated at 100. At 101 a determination is made as to whether an error was present with respect to the input and if such were the case, the routine jumps to the command return (CMDRTN) routine as indicated at 102. If no error was present, the command is examined to determine whether it is one of the possible commands that can be accepted beginning with the lowest numbered command. Thus, at 103 a determination is made as to whether the command is 28 and, if so, the routine jumps to the answer TUT (ANSTUT) routine as indicated at 104. If the command was not "28", a determination is then made at 105 as to whether the command was "32" and, if so, the routine jumps to the disconnect control (DISCNTL) routine as indicated at 106. The routine continues in this manner and when the last possible command "98" is questioned at 107 in the routine and is not found to be the command "98", a "1" is stored in error, as indicated at 108, and the routine jumps to the command return (CMDRTN) routine as indicated at 109. If a return is made to the command return routine, this, of course, indicates that the command input provided by the first two DTMF signals following the * input were incorrect.

With the routines that have been considered up to this point, all have been directed to placing a technician in the position for transmitting command signals to the MCU 15. We will now consider the various operations that will take place in response to the various possible commands that can be utilized beginning initially with the loop start (LOOPST) command. There are some elements of the loop start command that are common to the ground start (GRNDST) command routine and the answer TUT (ANSTUT) command routine as will be seen when the loop start routine is considered. The loop start command would be as follows: *57 TN # or *57 #. The "TN" portion of the command would be a one or two digit number corresponding to the trunk that is to be connected as a test trunk. Thus, if the trunk connected relay K20 was to be connected as the test trunk, the command would then be *57 20 #. If the command does not contain the number for "TN", the trunk that will be connected is the one that was last utilized.

Figure 11:
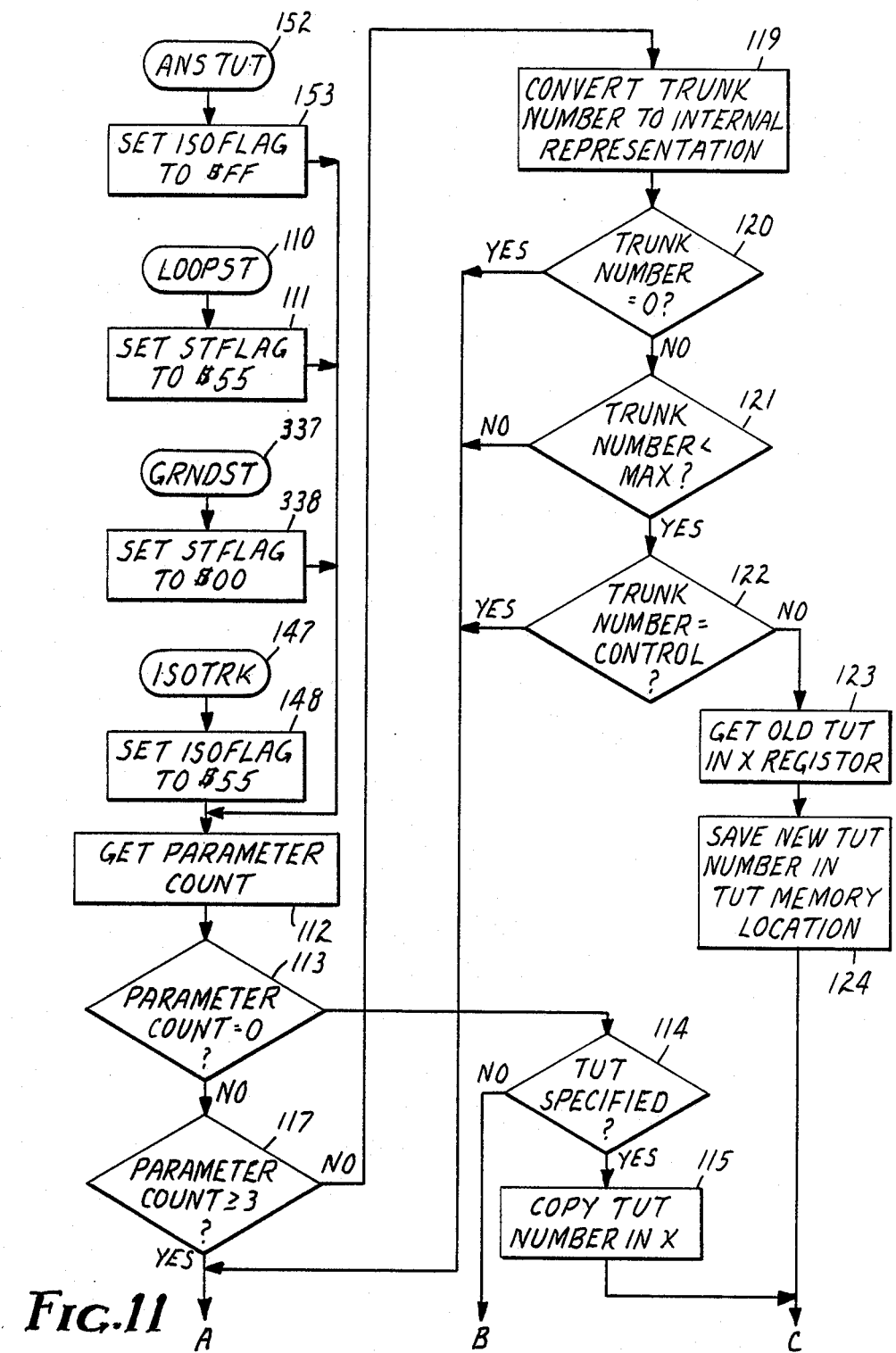
Figure 12:
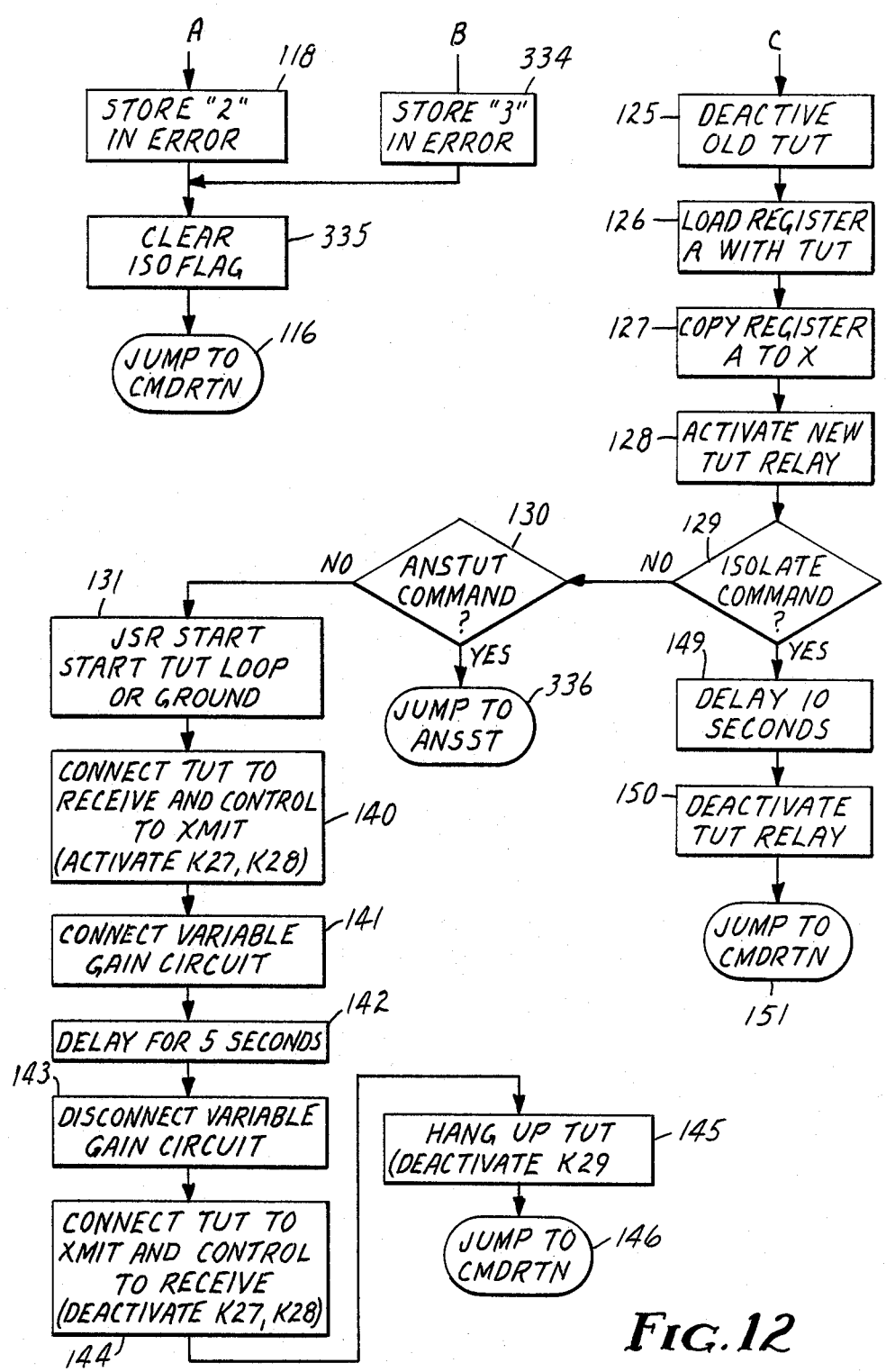

The loop start command begins at FIG. 11 and continues on FIG. 12. The entire diagram for the routine can best be seen by placing FIG. 11 above FIG. 12. The loop start command, answer TUT command, ground start command, and isolate trunk (ISOTRK) command have routines that have a common initial portion in that the routine is concerned with the trunk that is to be used as the test trunk (TUT). It will be noticed that a flag is used with each of the four commands that may be selected in connection with the routine shown in FIG. 11 so that the command can be identified later on in the routine. If a loop start command is given, entry is made at 110 and the start flag is set at $FF at 111. The routine then proceeds to the step at 112 where a count is made of the digits in the parameter portion of the command. A determination is first made at 113 as to whether the parameter count is equal to zero and, if it is, this would indicate that it is intended that the last TUT to be utilized, if there was one, is the TUT to be utilized with the command that is entered. This determination is made at 114. If the MCU 15 indicates that a prior command had not been entered in which the TUT was specified, a "3" is stored in error, as indicated at 334, the routine continues at 335 where the MCU 15 clears the isolate trunk flag and then jumps to the command return (CMDRTN) routine as indicated at 116. Returning to the point 113 in the routine where the determination is made as to whether the parameter count is equal to zero, the routine moves to 117 if the count was not equal to zero. At this point a determination is made as to whether the count is equal to or greater than three and if greater than three, this would be an error and a "2" would be stored in error by the MCU 15 as indicated at 118. The isolate trunk flag would then be cleared as indicated at 335 and the routine would jump to the command return routine as indicated at 116. Had the parameter count at 117 been found to be not greater than or equal to three, the routine would proceed to 119 where the trunk number, as designated by the parameter in the command, is converted to an internal representation in the MCU 15. The trunk number, of course, cannot be zero nor can it be the number of the control trunk that is being utilized and it must be less than the maximum number, i.e., 25. A check is, therefore, made at 120 to determine whether the trunk number is equal to zero and, if it is found to be zero, the routine proceeds to store a "2" in error at step 118. If the trunk number is not found to be zero, a determination is made at 121 as to whether the trunk number is less than maximum or 25 and, if hhat is not the case, the routine proceeds to step 118 in the routine. If the number is found to be less than the maximum, the routine proceeds to 122 where a determination is made as to whether the number designated in the command is the control trunk. If the command designated the control trunk, this too would be an error and the routin would proceeds to 118 where a "2" would be stored in error. If the trunk number designated in the command was not found to be the control trunk number, the routine requires that the old TUT be obtained from the X register, as indicated at 123, and that the new TUT number be placed in the TUT memory location as indicated at 124. The relay which is connected to the old TUT, if any, would be de-activated as indicated at 125 and register A would be loaded with the TUT number as indicated at 126 and would then be copied from register A to the X register, as indicated at 127, followed by actuation of the new TUT relay as indicated at 128.

Returning to the routine at 114, which is reached when the command that was entered did not contain a parameter to designate a trunk for the TUT to be used, the routine would proceed to 115 had there been a prior TUT utilized. The prior TUT number would be placed in the X register as indicated at 115 and the routine would then proceed to step 125 in the routine and, at step 128, the previously designated TUT would be the TUT relay that is actuated at step 128. At this point the trunk that was designated by the command would be connected to the transmission paths 10 and 11. At 129 in the routine a determination is made as to whether the routine had been initiated by an isolate command. Since the command that was entered was a loop start command, the routine proceeds to 130 where a determination is made as to whether the command initiating the routine was the answer TUT command. Since the command was the loop start command, the routine proceeds to 131 in the routine where the routine jumps to the start routine found at FIG. 14.

Returning to the first part of the routine shown in FIG. 11, it can be seen that a ground start (GRNDST) command could have been entered at 337 and after the start flag was set to $00 at 338, point 131 in the routine would have been reached in the same manner as has been described for the loop start command.

Figure 14:
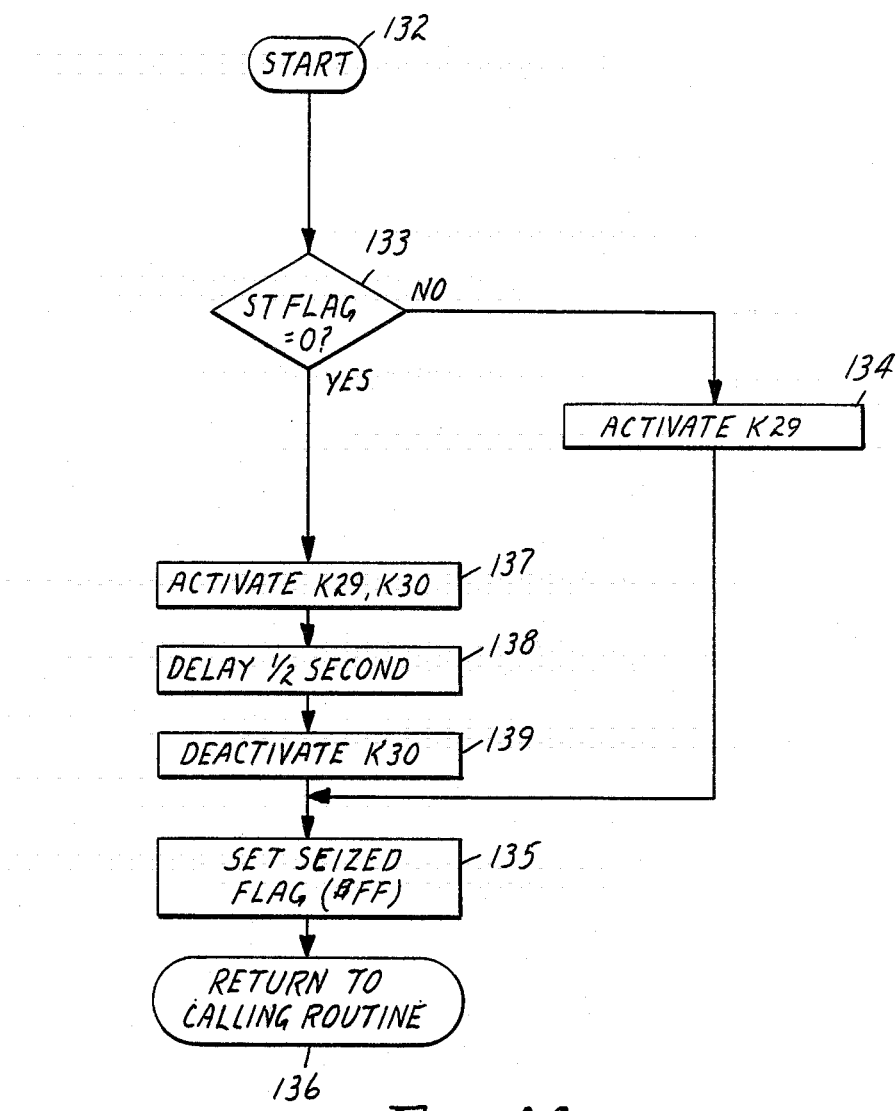

Turning to the start subroutine shown at FIG. 14, this routine is entered at 132 and a determination is made regarding the status of the start flag at 133. Since we have considered the case where the command was a loop start command, the start flag would not be found to be zero so the routine would proceed to 134 which would require the MCU 15 to provide the necessary signal to the relay driver 14 to activate relay K29 causing the TUT trunk, which had been connected by activation of the relay as determined, at point 128 in the routine to be "seized" or put in an "off hook" condition. This "seized" status is then noted at 135 by setting of the "seized" flag. As indicated at 136, a return is then made to the routine from which a jump had been made to the start subroutine.

Returning to 133 of the start routine, if it were found at this point that the start flag was equal to zero, this would mean that the command that had been entered was a ground start (GRNDST) command. This being the case, relays K29 and K30 would be acuuated, as indicated at 137, with a half second delay then provided as indicated at 138 followed by de-activation of relay K30 as indicated at 139. The routine then proceeds to the point 135 of the routine where the "seized" flag is set, since relay K29 has been actuated, with a return then being made to the routine from which a jump was made to the start routine. It can be seen that the ground start routine differs from the loop start (LOOPST) routine by the brief actuation of relay K30, which is shown in FIG. 2, serves to place a ground on the transmission path 11 which is a ring conductor. The ground start command would be used in those cases where it is necessary that this momentary ground be placed on the ring conductor in order to have a loop current initiated for the transmission paths 10 and 11 via the transformer 34.

Referring to FIG. 9 of the drawing, it can be seen that if a ground start (GRNDST) command is entered, it takes on a form as follows: *47 TN # or *47 #. As with the loop start (LOOPST) command, "TN" would be the number for the trunk that is to be connected as a TUT. If the command does not contain the number for "TN", the trunk that will be connected is the one that was last utilized.

Returning then to the routine in FIG. 12, point 142 is reached after the start subroutine has been completed at which time relays K27 and K28 are actuated, as indicated at 140, with the variable gain and switch circuit 36 conditioned so it will conduct as indicated at 141. When relay K29 was activaeed earlier in the start subroutine, this caused a dial tone to be presented to the transformer 34. With relays K27 and K28 actuated, the dial tone is passed to the receive input at gain stage 16 where it is passed via the variable gain and switch circuit 36 and limiter circuit 26 to the differential amplifier 35 where it is then transmitted via relay K28 to the transformer 29 for transmission over the control trunk enabling the technician to hear the dial tone. The dial tone is only heard for five seconds since completion of the delay of five seconds provided at 142 in the routine causes the variable gain and switch circuit 36 to be switched so it does not conduct, as indicated at 143, to terminate transmission of the tone signal to the telephone at the far end of the control trunk. As indicated at 144 of the routine, relays K27 and K28 are de-activated with K29 also being de-activated as indicated at 145 of the routine. A jump is then made to the command return routine as indicated at 146.

Summarizing the loop start (LOOPST) command and ground start (GRNDST) command routines which have just been described, both routines can be used to select a trunk for connection as a test trunk with the test trunk after it is connected then being "seized" or taken off hook with relays K27 and K28 actuated and the variable gain and switch circuit 36 conditioned so that a transmission path is completed between the transformer 34 to the telephone at the far end of the control trunk to enable the technician to hear the dial tone that is presented on the TUT when it is "seized" by actuation of relay K29. Following a time period of five seconds, this communication path is opened when the variable gain and switch circuit 36 is opened followed by de-activation of relays K27 and K28, with relay K29 also de-activated to place the TUT on hook. The circuitry then in condition for receiving the next command to be entered.

Another command, the isolate trunk (ISOTRK) command, like the loop start and ground start commands, can include a designation as to the trunk that is to be connected as the trunk under test or TUT. The routine that has been discussed in connection with FIG. 11 for the loop start and ground start control and which continues to point 129 on FIG. 12 is also followed when an isolate ttrunk command is entered. Referring to the beginning of the routine as shown in FIG. 11, an isolate trunk command is entered at 147 with the isolate trunk flag then being set at 148. The routine then proceeds as was described for the loop start command with the trunk to be tested (TUT), which was designated in the isolate trunk command, being connected to the transmission paths 10 and 11 by actuation of the relay for the designated trunk. Referring to FIG. 9 of the drawing, the number "48" is used for the isolate trunk command so the isolate trunk command would be as follows: *48 TN # or *48 #. "TN" in the command designates the trunk to be used as a test trunk (TUT). If the command does not contain the number for "TN", the trunk that will be connected is the one that was last utilized. For example, if a loop start command had been used designating trunk 20 and the test carried out by that command had been completed with the technician desiring to then use the trunk 20 with an isolate command, the isolate command that would be entered would take on the form *48 #. Entry of an isolate command would, as has been indicated, point 129 in the routine to be reached upon actuation of the relay for the trunk to be used as the trunk under test (TUT). The query made at 129 as to whether the command is an isolate command would be answered in the affirmative causing the MCU 15 to cause a 10 second delay to be provided, as indicated at 149 followed by de-activation of the relay for the TUT as indicated at 150 with a jump then made to the command return routine as indicated at 151. The isolate command (ISOTRK) thus functions to cause a desired trunk to be connected as the test trunk with such trunk then being removed from connection as a test trunk after a delay of 10 seconds. During this operation relay K-29 is not actuated. This type of action taken with respect to a particular trunk has been found to be useful in correcting some situations where trouble is suspected to be present on the trunk.

Figure 13:
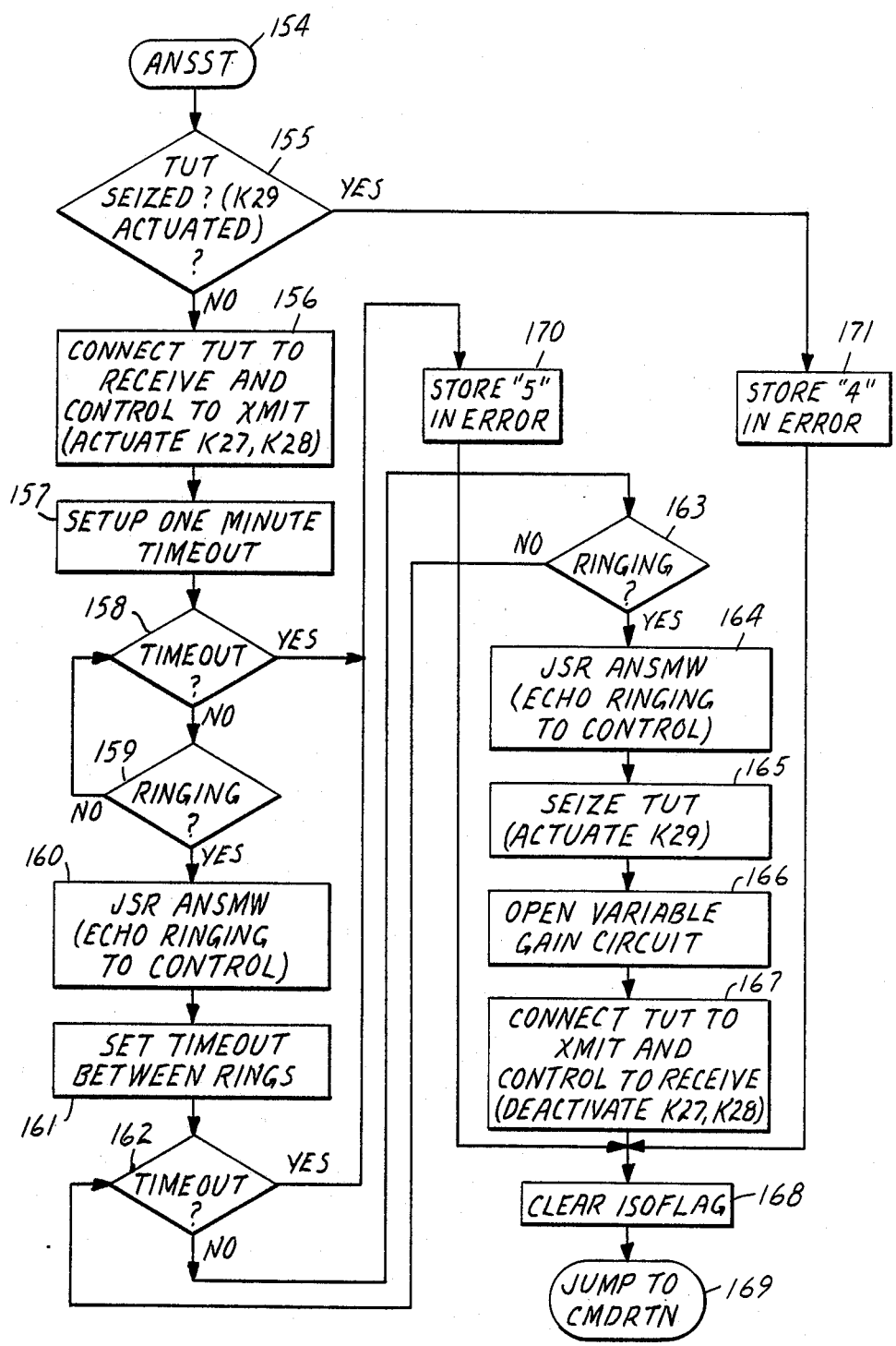

Another command which utilizes the routine as set forth in FIG. 11 through point 128 of the routine on page 12 is the answer TUT (ANSTUT) routine. Like the loop start, ground start, and isolate trunk routines, the answer TUT routine includes a designation of the trunk desired to be tested by the test provided by the routine. Referring to FIG. 9 of the drawing, the answer TUT routine utilizes the number "28" to designate the command and so would be entered in the following form: *28 TN # or *28 #. "TN", of course, being the number designating the trunk to be connected as the TUT. The other form of the command means that the trunk that will be connected will be the last trunk that was connected as a test trunk. Referring to FIG. 11, the answer TUT routine is entered at 152 with the isolate trunk flag set to $FF at 153. The routine then proceeds to 129 in the routine, as described in connection with the loop start command, except that the trunk that is connected is the one designated by the answer TUT command and the relay for such trunk will be actuated at point 128 of the routine. Proceeding to 129 of the routine, a query is made as to whether the command is the isolate trunk command, which in this case would be answered in the negative, causing the routine to proceed to 130 where the query is made as to whether the command is the answer TUT command. Since it is the answer TUT command, the routine then jumps to the answer selected TUT (ANSST) subroutine as indicated at 1336. The answer selected TUT routine is set forth in FIG. 13. Referring to FIG. 13, the answer selected TUT subroutine is entered at 154 and proceeds to 155 in the routine where a query is made as to whether the TUT has been seized, i.e., whether relay K29 is actuated. It is the function of the answer TUT routine to determine whether a call can be made to the TUT and have that call answered Accordingly, if a call is to be made to the TUT, it is necessary that the TUT present an "on hook" condition, i.e., relay K29 must not be activated. Thus, if it is determined that at 155 of the routine that K29 is not actuated, the routine proceeds to 156 at which point relays K27 and K28 are actuated causing the transformer 34 for the TUT to be connected to the receive input at the gain stage 16 and the transmit output of the differential amplifier 35 to be connected to the transformer 29 for the control trunk. A one minute timeout period is then set up at 557 of the routine. When the technician enters an answer TUT command, he will have a telephone available and must know the telephone number for the TUT that has been selected and will place a call to the TUT after entering the answer TUT command. The one minute timeout period which is mentioned provides one minute for the technician to complete the call to the TUT. The MCU 15 then proceeds to monitor bit PD4 of PORT D which is connected to the ringing detector 30 to determine whether a ringing signal has been received by the ringing detector circuit 30 and also monitors the timeout to determine whether the one minute period has expired. This is indicated at 158 and 159 wherein a determination is made at 158 as to whether the timeout period has expired and, if not, the routine proceeds to 159 where a query is made as to whether any ringing ss present which would be detected by a signal on bit PD4 of PORT D if the ringing detector 30 has detected ringing. If no ringing has been detected, the routine loops back to 158 where another look is made to determine the condition of the one minute period and, if it has not expired, the routine returns to point 159 in the routine to determine whether any ringing is present. If ringing is detected, the routine proceeds to 160 of the routine where a jump is made to the answer milliwatt (ANSMW) subroutine. The answer milliwatt subroutine is set forth in FIG. 32 of the drawing. A description of the answer milliwatt routine will not be given at this time. It is sufficient for purposes of discussing the present routine that only the function of the answer milliwatt routine be indicated. The answer milliwatt routine serves to cause the MCU 15 control the tone generator 23 to produce a 1,004 HZ signal which is applied to the differential amplifier 35 and with relays K27 and K28 actuated, as indicated at point 156 of the routine, causes the signal to be sent to the far end of the control trunk where it can be heard by the technician at the far end of the control trunk for the time the detected ringing signal is present indicating that his call on the TUT is in the ringing stage. A return is made to the answer selected TUT routine when the ringing signal stops and a timeout period is established at 161 which will expire if another ringing signal is not received in the normal time that it takes between ringing signals. This timeout period is monitored at 162 and, if it has not expired, the routine proceeds to 163 of the routine where a query is made as to whether any ringing is detected by the ringing detector circuit 30. If this ringing query is answered in the affirmative, the routine then proceeds to again jump to the answer milliwatt subroutine which, as has been indicated, will cause a 1,004 HZ signal to be sent to the technician's telephone at the far end of the control trunk to again indicate that a second ringing signal has been received. The answer milliwatt routine returns to the answer selected TUT routine when the ringing signal stops. The return is made at 165 of the routine at which time the relay K29 is actuated to place the TUT off hook or to "seize" the TUT. The variable gain and switch circuit 36 is then opened as indicated at 166 and relays K27 and K28 are de-activated. The isolate trunk flag is then cleared at 168 and the routine jumps to the command return (CMDRTN) routine as indicated at 169.

Returning to the query made at point 155 in the routine for the answer selected TUT subroutine, if it had been found that the relay K29 was actuated, a "4" would be stored in error, as indicated at 171, and the routine would proceed to 168 where the isolate trunk flag would be cleared and the routine would jump to the command return routine at 169. The "4" stored in error would be read out during the command return routine and would result in four beeps being sent to the technician at the far end of the control trunk serving to let him know that the TUT was already seized. If the timeout query at 158 or at 162 were answeeed in the affirmative, this would result in a "5" being stored in error, as indicated at 170, with the routine then proceeding to 168 where the isolate trunk flag is cleared and a jump is made, as indicated at 169, to the command return routine. The "5" stored in error would be read out during the command return routine resulting in five beeps being sent to the technician at the far end of the control trunk serving to indicate to the technician that the timeout periods provided had expired before a call was completed.

Whenever the answer TUT command is completed, a situation exists wherein a TUT is connected, a telephone is connected to the TUT at its far end, relay K29 is de-activated along with relays K27 and K28, and a telephone is connected at the far end of the control trunk with relay K26 activated. There are four commands which require utilization of the TUT that can be used following use of a answer TUT command. These commands are the transmit to TUT (XMITUT) command, milliwatt to TUT (MWTUT) command, LISTEN command, and TALK command. The flow or routine diagrams for these commands will be discussed in the order that the commands have been listed.

Figures 15, 17:
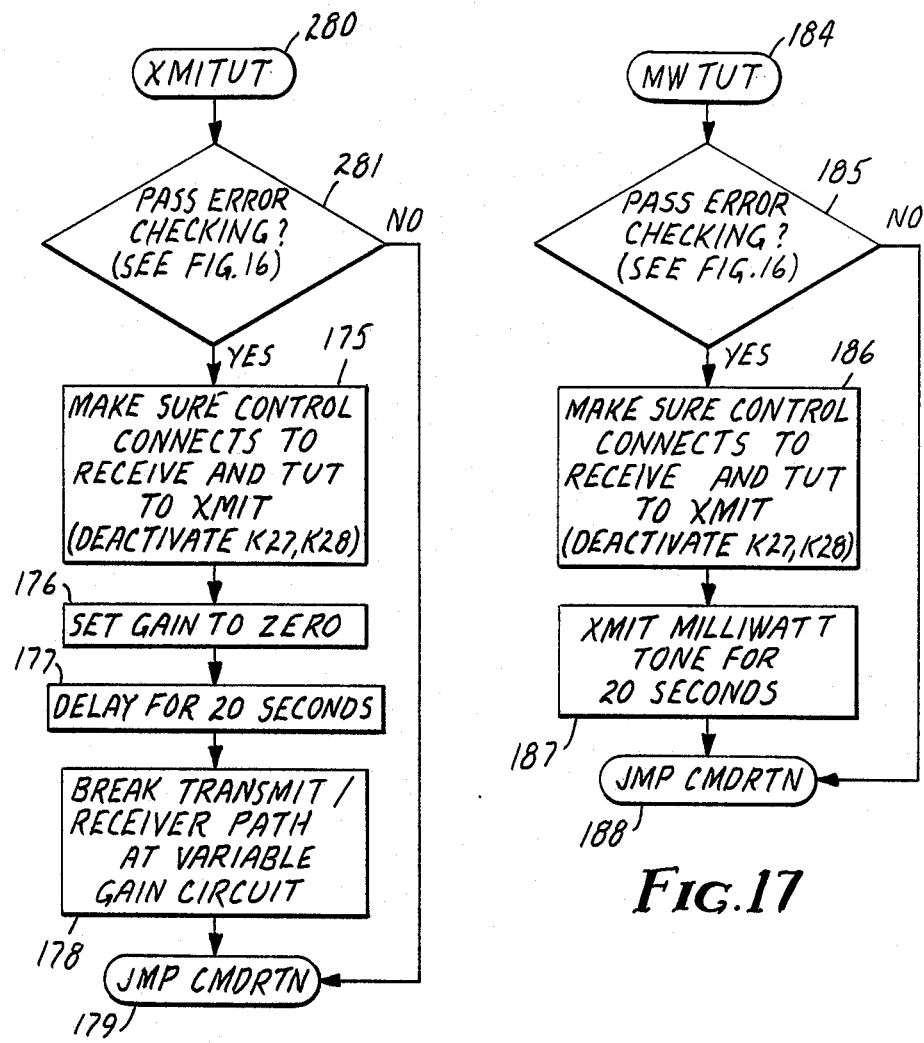
Figure 16:
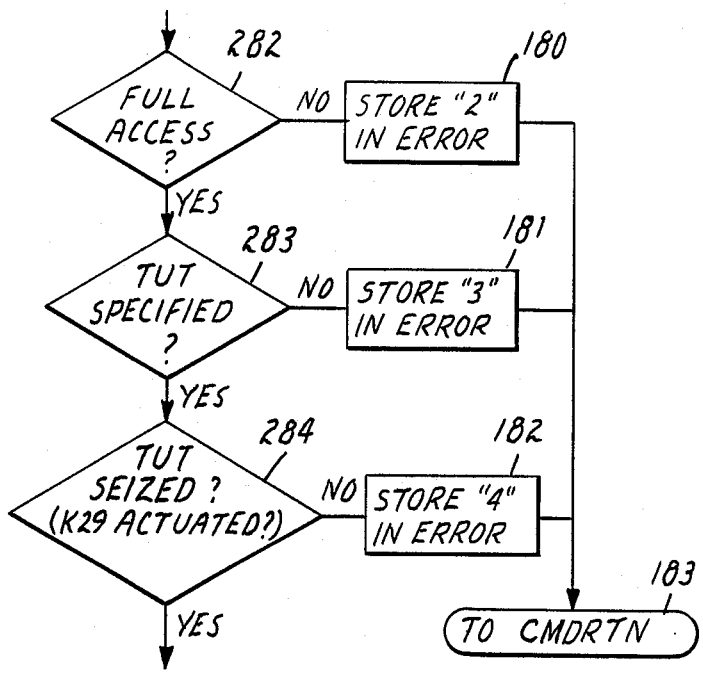

The routine diagram for the transmit to TUT (XMITUT) command is set forth in FIG. 15 of the drawing. Referring to FIG. 10, the transmit to TUT (XMITUT) routine utilizes the number "98" to designate the command and so would be entered in the following form: *98 #. The routine begins at 280 and then proceeds to a portion of the routine at 281 and which is set forth in detail in FIG. 16 which checks to determine whether certain error conditions exist which prevent the command from being completed. This error checking portion of the routine is set forth in FIG. 16 and is one which also appears in the routines for milliwatt to TUT, LISTEN, and TALK. Referring to FIG. 16 for this portion of the routine, a first check is made to determine whether it is a routine which can be entered. This determination is made at 282. It should be pointed out that a restricted access flag is set if the password is all zeros and is set during the ring 12 routine which involees another way for a technician to be placed in a position where commands can be enteredaafter making a call on a specified control trunk. Assuming the restricted access flag has not been set, the routine proceeds to 283 where a determination is made as to whether a TUT is specified, i.e., is there trunk connected to the transmission paths 10, 11. If this is answered in the affirmative, the routine proceeds to make a query at 284 as to whether the TUT is "seized", i.e., whether relay K29 is actuated. If this query is answered in the affirmative, the routine then proceeds to 175 of the routine as shown in FIG. 15. Had the restricted flag been found to be set, the query made at 282 would have been answered in the negative causing a "2" to be entered in error as indicated at 180 with the routine then proceeding to the command return routine as indicated at 183. Had an attempt been made to use the transmit TUT command when a TUT was not connected to transmission paths 10, 11, the query at 283 would have been answered in the negative causing a "3" to be stored in error as indicated at 181, the routine then jumping to the command return routine as indicated at 183. If the TUT connected to transmission paths 10, 11 is not "seized", i.e., relay K29 is not actuated, the routine requires that a "4" then be entered in error as indicated at 182 with the routine then jumping to the command return routine as indicated at 183. Returning then to 175 of the transmit to TUT routine of FIG. 15, which is reached when there are no errors entered during the routine portion as set forth in FIG. 16, relays K27 and K28 are de-activated to make sure that the control trunk is connected to the receive input of the gain stage 16 and the TUT is connected to the transmit output of the differential amplifier 35. The routine then provides for the variable gain and switch circuit 36 to be set with the gain at zero as indicated at 176 with a delay provided at 177 for a limited time, such as 20 seconds. After the 20 second delay, the switch at the variable gain and switch circuit 36 is opened as indicated at 178 and the routine then jumps to the command return routine as indicated at 179. The transmit to TUT command, therefore, serves to provide a communication path for a short period of time to allow a transmission to be made at the telephone at the far end of the control trunk to the telephone at the far end of the TUT during the time period provided. The transmission level will be limited to −10 DB milliwatt.

The milliwatt to TUT (MWTUT) routine is set forth in FIG. 17. Referring to FIG. 9, the milliwatt to TUT (MWTUT) routine utilizes the number "68" to designate the command and so is entered in the following form: *68 #. Entry of the routine is indicated at 184. The routine requires the same error checking to be made at 185 as was required in the transmit to TUT routine at 281. If no error was stored in error during the portion of the routine set forth in FIG. 16, the routine proceeds to 186 where relays K27 and K28 are de-activated to make sure the control trunk is connected to the receive input at the gain stage 16 and the TUT is connected to the transmit output at the differential amplifier 35. The routine then proceeds to 187 where the tone generator 23 under the control of the MCU 15 causes a −10 DB milliwatt signal at 1,004 HZ to be transmitted to the TUT via the differential amplifier 35 for a short period of time, such as 20 seconds. The routine then proceeds to jump to the command return routine as indicated at 188. Had the query made at 185 indicated that an error had been stored in error, the routine would have jumped to the command return routine as indicated at 188.

Figure 18:
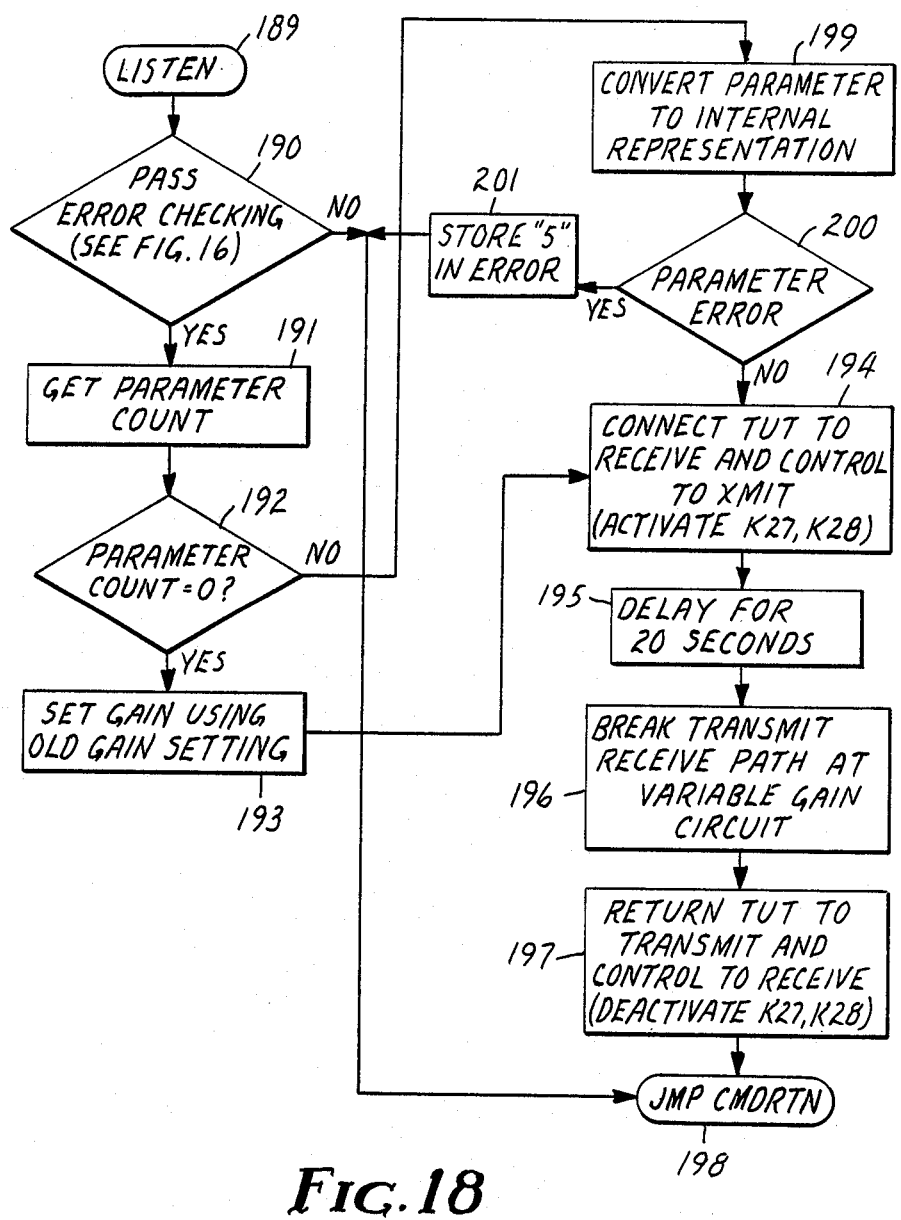

The next routine to be considered is the routine for the LISTEN command which is set forth in FIG. 18. The LISTEN command provides for the setting of the variable gain and switch circuit 36 for a gain of zero, 10, or 20 DB, with the relays K27 nnd K28 actuated for a limited period of time, such as 20 seconds, during which period a transmission can be initiated at the far end of the TUT trunk and can be detected at the far end of the control trunk. Referring to FIG. 10, the command number for the LISTEN command is "58" so the comaand can take either of the following forms: *58 G # or *58 #. The letter "G" represents the number that is sent to indicate the gain setting to be used. When "G" is zero, the gain setting will be zero DB, when "1", the gain setting will be 10 DB, and when "2", the gain setting will be 20 DB. If no parameter is used following the number "58", the gain last used for the variable gain and switch circuit 36 is then utilized. Referring to FIG. 18, the LISTEN routine begins at 189 and then proceeds to 190 wherein the error checking portion of the rottine is carried out as set forth in FIG. 16 and, if no error was stored in error, the routine proceeds to 191 where a determination is made of the parameter count for the command, i.e., the number of digits following the number "58" of the command. A query is then made at 192 as to whether the parameter count is equal to zero and, if it is equal to zero, the routine proceeds to 193 where action is taken to set the gain to provide the prior gain that had been utilized. The routine then proceeds to 194 at which point relays K27 and K28 are actuated to establish a transmission path from the TUT side of the circuitry to the receive input at the gain stage 16 and thence to the differential amplifier transmit output to the transformer 29 so that any transmission from the far end of the TUT will be sent to the far end of the control trunk. A delay is provided, as indicated at 195, for a short period of time, such as 20 seconds, to provide a time for the transmission of an input made at the far end of the TUT to the far end of the control trunk. The transmission path is opened by opening the switch at the variable gain and switch circuit 36 as indicated at 196 followed by the de-activation of relays K27 and K28, as indicated at 197. The routine then proceeds to 198 which is a jump to the command return routine. A return is also made to the command return routine in the event the error check made at 190 indicated an error had been entered in error. Returning to 192 of the routine where a determination is made as to whether the parameter count is equal to zero, the routine would proceed to 199 of the command if the parameter count were not equal to zero. At this point the parameter would be converted to an internal representation in the MCU 15. A check is then made at 200 to determine whether the parameter transmitted as a part of the LISTEN command contained any errors. If no rrrors were found, the routine woul then proceeds to point 194 of the routine. Had the parameter been found to be a bad parameter, the routine would proceeds to 201 and "5" would be stored in error, with the routine then jumping to the command return routine as indicated at 198.

Figure 19:
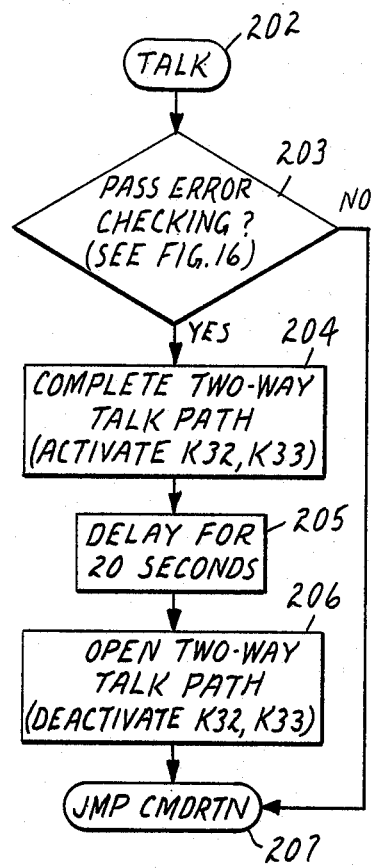

The next routine to be considered is the one initiated by the entry of a TALK command. The routine is set forth in FIG. 19. Referring to the command routine set forth in FIG. 10 the number used for the TALK routine is "88". The form for the command is *88 #. The TALK command serves to establish a two-way talk path between the far end of the control trunk and the far end of the TUT. It is established by the actuation of relays K32 and K33 and is provided for a short period of time, such as 20 seconds. Referring to FIG. 19, the routine for the TALK command begins at 202 and hhen proceeds to 203 where the same error checking per FIG. 16 is conducted, as was the case for the transmit to TUT command, the milliwatt TUT command, and the LISTEN command. If no error were stored as a result of the error checking made at 203, the routine proceeds to 204 wheee relays K32 and K33 are actuated to connect transformers 34 and 29 directly together and thereby establish a transmission path to a two-way transmission path between the far end of the TUT and the far end of the control trunk. A delay for a short time, such as 20 seconds, is provided at 204 before the relays K32 and K34 are de-activated to open the two-way transmission path as indicated at 206. Following de-activation of relays K32 and K33, the routine then jumps to the command return routine as indicated at 207.

Figure 20:
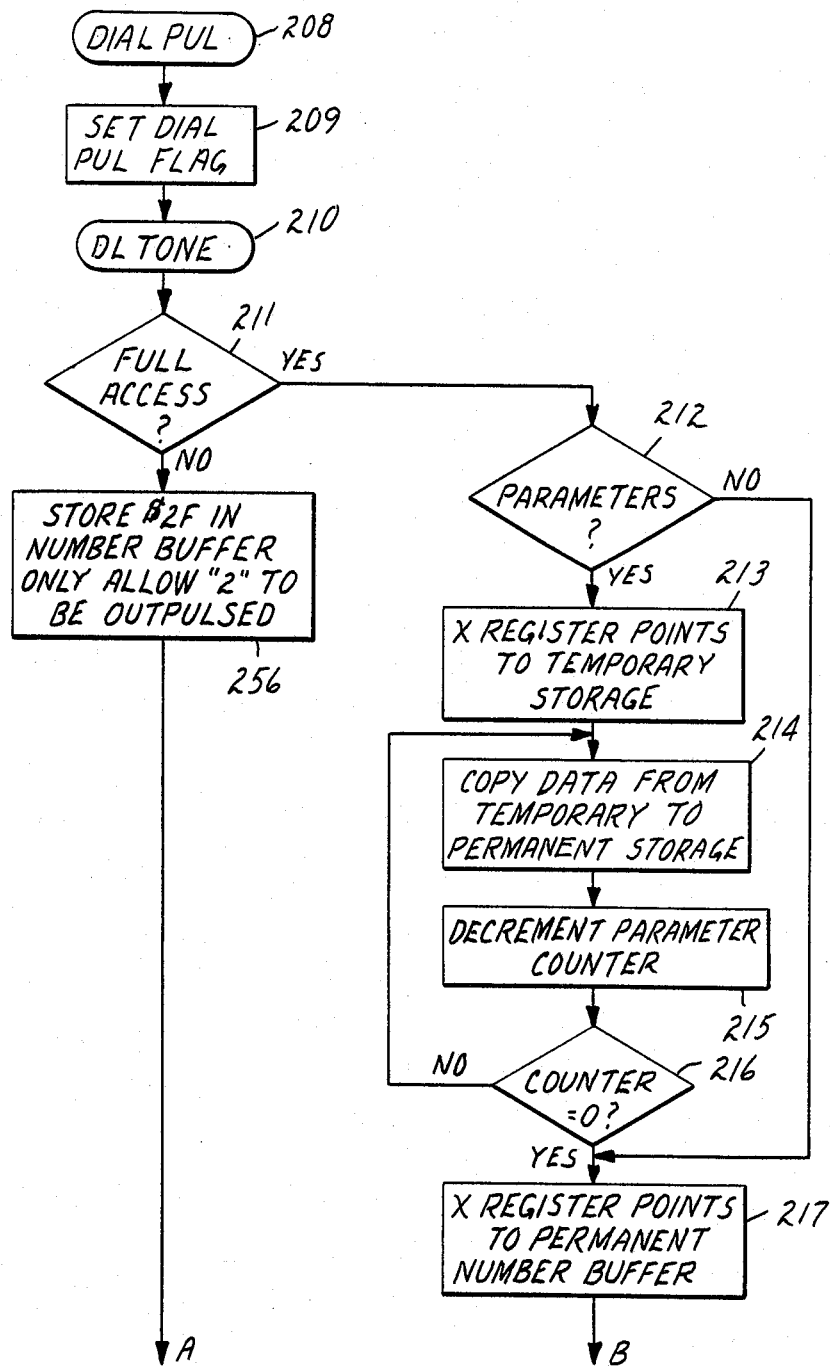

The routine associated with the dial pulse (DIALPUL) command and the dial tone (DLTONE) command will now be considered. The routine for the dial pulse command and dial tone command is set forth in FIGS. 20-22 of the drawing. The entire routine can be seen if FIG. 20 is placed above FIG. 21 with FIG. 21 above FIG. 22. Referring to FIG. 9 of the drawing, the number used for the dial pulse command is "37". The dial pulse command takes on a form as follows: *37 n . . . nnn # or *37 #. The "n . . . nnn" portion of the dial pulse command are the digits for the number to be dialed. If the *37 # is used, the last telephone number dialed will be used again. Referring to FIG. 9, the number "38" is the command number for the dial tone command. The dial tone command will take on a form as follows: *38 n . . . nnn # or *38 #. The "n . . . nnn" in the command are the digits for the number to be called. If the *38 # is used, the last telephone number dialed will be used again. The dial pulse or dial tone command can be successfully used to call a number from the telephone at the far end of the control trunk provided a TUT has been selected and is connected to the transmission paths 10, 11 and the relay K29 is not activated. In the event a TUT is not connected to the transmission paths 10, 11, this will be detected and three error beeps will be sent to the technician at the far end of the control trunk so corrective action can be taken to select a TUT and have it connected to the communication paths 10, 11. This would be done by using the ground start or loop start command. Had the dial pulse command or dial tone command been entered and the TUT connected to the transmission pair 10, 11 was found to be "seized", i.e., relay K29 was found to be activated, four beeps would be sent to the technician at the far end of the control trunk. To remedy this situation, the technician can enter an on hook TUT (ONHKTUT) command which serves to de-energize the relay K29. The on hook TUT command will be described later.

Figure 21:
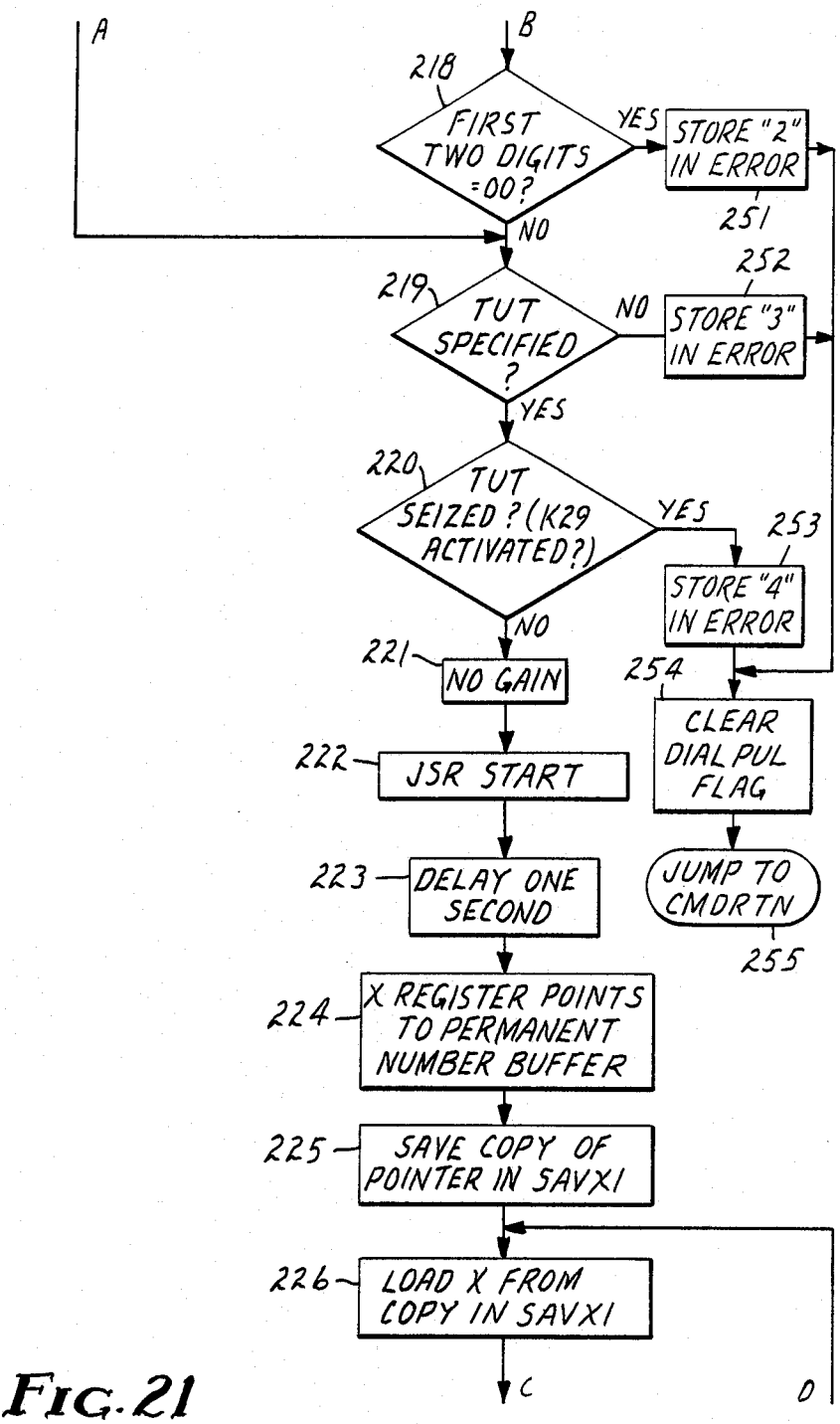
Figure 22:
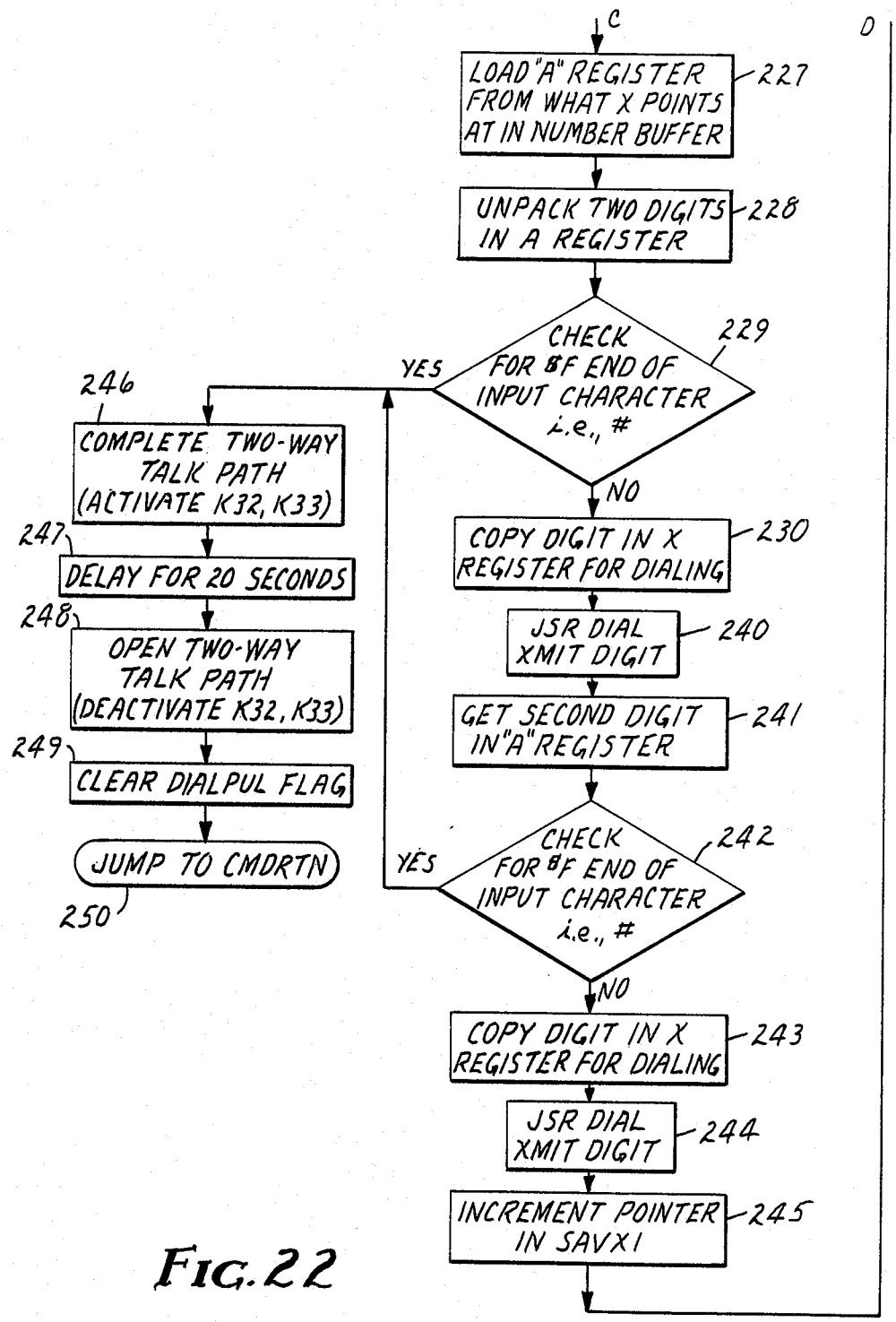

Referring now to FIGS. 20-22, entry is made at 208 and, if the command entered is a dial pulse command, the dial pulse flag is set at 209. If it were a dial tone command, the dial pulse flag, of course, is not be set and the routine proceeds to 210 in the routine. A determination is then made at 211 as to whether the restricted access flag has been set. If the restricted access flag has not been set, full access is available and the routine proceeds to point 212 of the routine where a determination is made as to whether the command contains any parameters, i.e., any numbers following the number for the command. If this is answered in the affirmative, the routine proceeds to 213 and the X register in the MCU 15 points to temporary storage. At 214 the routine then copies the data from the temporary storage and places it in permanent storage. Proceeding to 215 in the routine, the parameter counter is decremented and a query is made at 216 as to whether the counter is equal to zero. If this query is answered in the negative, the routine returns to 214 and, if answered in the affirmative, the routine goes to 217 where the X register points to the permanent number buffer and a determination is made at 218 as to whether the first two digits equal "00". If this is answered in the negative, the routine proceeds to 219 where a query is made as to whether a TUT is specified. If this is answered in the affirmative, a further query is made at 220 as to whether the TUT is "seized", i.e., whether relay K29 is activated. Relay K29 must not be activated since it must be later activated in the routine so a dial tone can be obtained and the desired dialing take place. If the query at 220 is answered in the negative, the routine proceeds to 221 where the gain for the variable gain and switch circuit 36 is set at 0 DB. A jump to the start subroutine is then made, as indicated at 222, which is set forth in FIG. 14 and provides for actuation of the relay K29. A one second delay is provided at 223 with the X register then pointing to the permanent number buffer 224. Proceeding to 225 of the routine, the X register pointer is saved in memory position (SAVX1) and at 226, such information is loaded in the X register. Register A is then loaded with the information with respect to what the X register points to in the number buffer, as indicated at 227, with two digits in the A register then obtained as indicated at 228. A check is then made at 229 to determine whether the end of the input character, i.e., #, has been obtained. If this is answered in the negative, the routine proceeds to 230 where the digit for dialing is placed in the X register. A jump is then made to the dial subroutine for transmission of the digit, as indicated at 240. A description with respect to the dial subroutine will be provided later.

The routine then proceeds to 241 where the second digit in the A register is obtained and followed by a check at 242 as to whether this digit is the character provided at the end of the DTMF input, i.e., #. If this query is answered in the negative, the digit for dialing is entered in the X register as indicated 243. As for the first digit to be dialed, a jump is made to the dial routine and the digit is transmitted, as indicated at 244. The pointer in the SAVX1 memory position is incremented, as indicated at 245, and the routine returns to 226 in the routine. The routine from 226 through 245 is again repeated until such time as the check made at 229 or 242 is answered in the affirmative, at which time it is established that the entire telephone number designated in the parameter for the dial pulse or dial tone command has been dialed. Relays K32 and K33 are then actuated, as indicated at 246, to cause a two-way talk path between the telephone at the far end of the control trunk and the telephone called at the far end of the TUT. This talk path is maintained for a short period of time, such as 20 seconds, by a delay that is provided at 247. Upon completion of this delay, relays K32 and K33 are deactivated to terminate the talk path. This termination action occurs at 248 in the rottine. The dial pulse flag is then cleared at 249 and the routine jumps to the command return routine as indicated at 250.

Returning to the query made at 218 in the routine, which appears at the top of FIG. 21, a "2" would be stored in error if the query was answered in the affirmative, with the routine then proceeding to 254 where the dial pulse flag is cleared and a jump is then made as indicated at 255 to the command return routine. Similarly, if the query made at 219 was answered in the negative, a "3" is stored in error and the routine proceeds to 254 in the routine for clearing of the dial pulse flag and a jump to the command return routine. If the query at 220 had been answered in the affirmative, a "4" would be stored in error with the dial pulse flag then cleared, as indicated at 254, with a jump then made to the command return routine.

Returning to the query at 211 of the routine, if this query were answered in the negative, i.e., full access is not available, causing the routine at 256 to provide for storing $2F in the number buffer which serves to allow only a single digit "2" to be dialed. This serves to break dial tone without allowing a call to be completed.

The dial pulse and dial tone routines are somewhat similar to the answer TUT routine, in that after the routine has been completed, the control trunk is "seized" as is the TUT. This allows the technician to then use the following commands for testing the TUT: transmit to TUT command, which serves to provide a one-way transmission path from the control trunk to the TUT; the LISTEN command, which allows the technician to listen to any transmissions from the far end of the TUT at a gain which is indicated as a part of the command; the TALK command, which establishes a two-way talk path between the far end of the control trunk and the far end of the TUT which is provided for a limited period of time; and the milliwatt to TUT command, which provides for the transmission of a −10 DB milliwatt tone to TUT for a limited period of time. When the technician completes all the tests he wishes to have made following entry of a dial pulse or dial tone command, the technician will utilize the on hook TUT command to hang up the TUT or place the TUT on hook. This, of course, is accomplished by de-activating relay K29.

Figure 23:
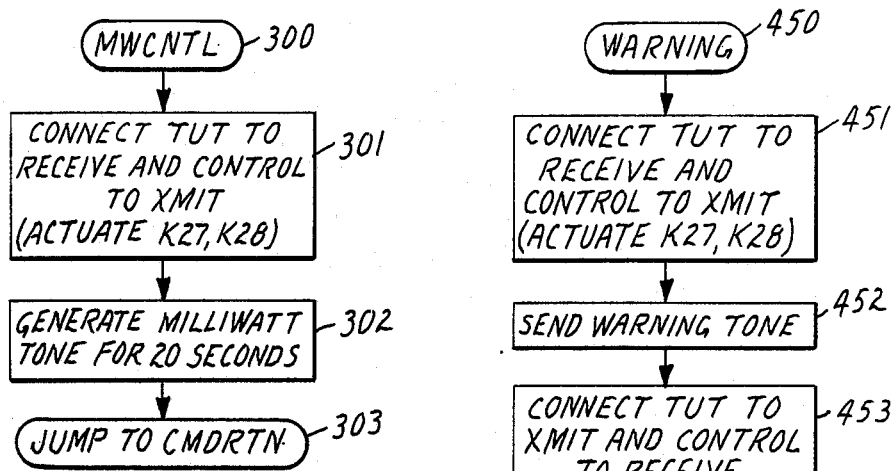

The next routine to be considered is for the milliwatt control (MWCNTL) command which is set forth in FIG. 23. Referring to FIG. 10, the number for the milliwatt control command is "62". The form for the command is *62 #. This command serves to provide a milliwatt tone at a frequency of 1,004 HZ for transmission to the far end of the control trunk. This action enables the technician at the control end of the control trunk to measure the quality of the transmission which could be compared with a similar test made when a milliwatt TUT command is used for a particular TUT to obtain a quality measure of the transmission made on the TUT. The milliwatt control trunk is entered at 300 with the routine continuing at 301 where relays K27 and K28 are actuated. Actuation of relay K28 will provide a path from the output of the differential amplifier 35 to the transformer 29 so that any transmission from the differential amplifier 35 will be transmitted to the far end of the control trunk. As indicated at 302 in the routine, the MCU 15 controls the tone generator 23 to cause it to produce a −10 DB milliwatt tone which is applied to the differential amplifier 35 and then to the control trunk for transmission to its far end. The sending of this tone is indicated at 302. The routine then jumps to the command return routine as indicated at 303.

Figure 25:
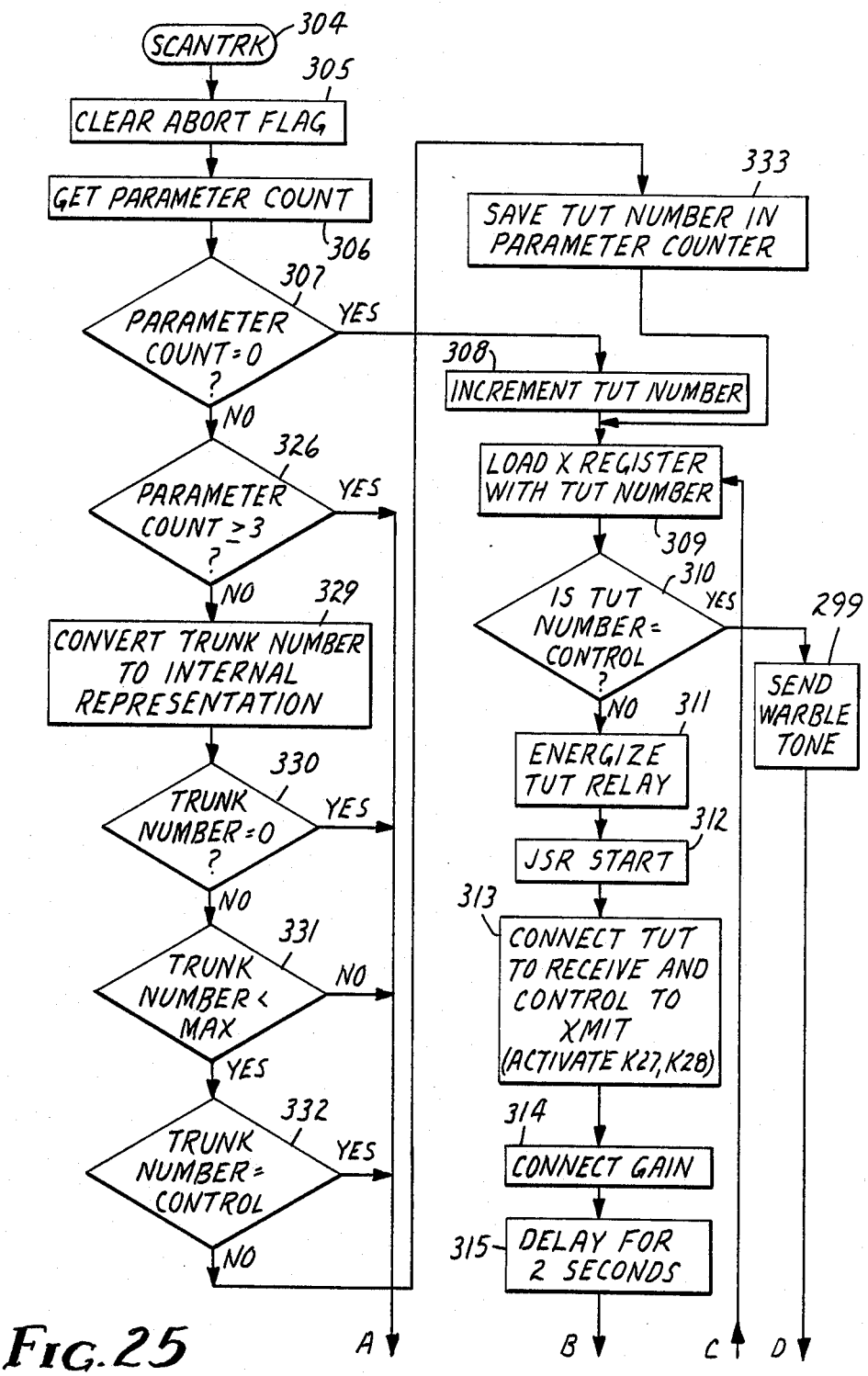
Figure 26:
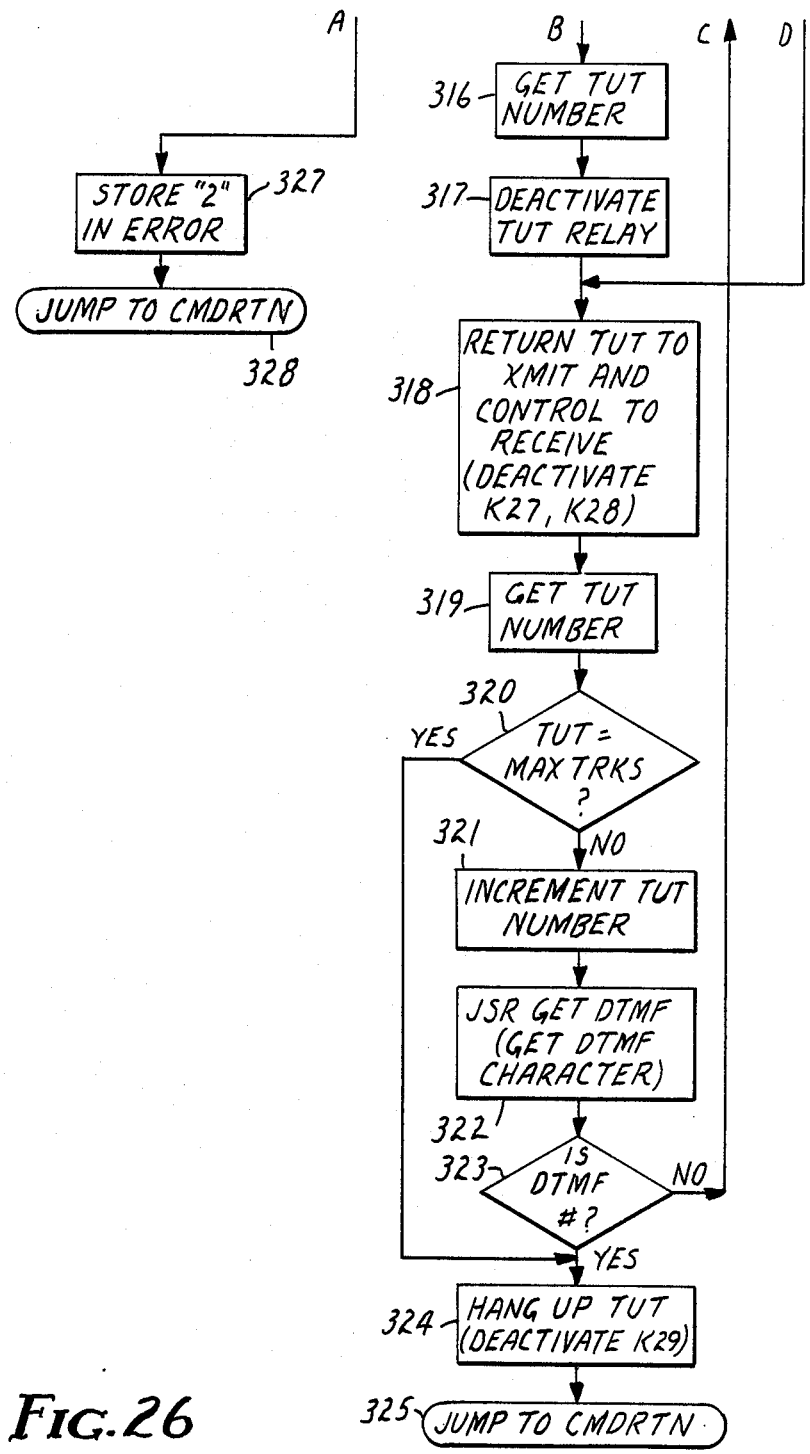

The scan trunk (SCANTRK) command routine is the next one to be considered and it is set forth in FIGS. 25 and 26 of the drawing. If FIG. 25 is positioned above FIG. 26, the entire routine can be viewed. This command enables the technician to designate a TUT for connection to the transmission paths 10, 11, operate relay K29 and listen to the dial tone that appears on the TUT for a short period of time. Termination of the dial tone occurs when the relay for the TUT is de-activated. The command then allows the technician to enter any telephone key entry except the # key to step to the next trunk and repeat the same dial tone test and thus proceed in a step-by-step fashion to include all of the trunks desired to be tested having a number higher than the selected trunk except the trunk that is used as the control trunk. The procedure can be terminated at any point by actuation of the # key. Turning to FIG. 10 of the drawing, it is seen that the scan trunk command uses the number "78". The form for the scan trunk command is, therefore, *78 ST #, where "ST" is the number of the TUT where the scan is to begin. *78 # can also be used as the form for the scan trunk command. In this case, with no parameter provided, the scanning starts with the trunk which connects to the relay K1. Referring to FIG. 25, the scan trunk routine begins at 304 and, as indicated at 305, the abort flat is cleared. Clearnng the abort flag allows the * key to be used as one of the keysffor stepping to the next trunk. Next, a count of the parameter is obtained at 306. At 307 a determination is made as to whether the parameter count is equal to zero and, if it is answered in the affirmative, the routine proceeds to 308. The parameter count would be zero if the command were entered in the form *78 #. At 308 the TUT is incremented so the trunk to be connected will be the trunk which is connected to relay K1. At 309 of the routine the TUT number is loaded in the X register and the routine proceeds to 310 where a query is made as to whether the TUT is the control trunk. In this case the answer is "no", so the routine proceeds to 311 where the MCU 15 causes the relay K1 to be energized. With relay K1 energized, the trunk connected to relay K1 is removed from the PBX and is connected to the transmission pair 10, 11. The routine then jumps to the start subroutine at 312. The start subroutine is set forth in FIG. 14 and has been described in detail in connection with the answer TUT (ANSTUT) routine. The start subroutine would cause relay K29 to be actuated to cause a dial tone to appear at the transformer 34. Relays K27 and K28 would then be activated as indicated at 313 of the routine to connect the TUT transformer 34 to the receive input at the gain stage 16. The variable gain and switch circuit 36 would be set to conduct as indicated at 314 causing the tone control appearing on the TUT to be transmitted to the gain stage 16 and via the variable gain and switch circuit 36 to the limiter circuit 26 and thence to the differential amplifier 35 where it is then transmitted to the control transformer 29 via the relay K28 for transmission to the far end of the control trunk. A delay for a short period, such as two seconds, is provided at 315 and at 316 the TUT number is obtained and the relay to which the TUT is connected is de-activated, as indicated 317, to terminate the dial tone. At 318 in the routine, relays K27 and K28 are de-activated with the TUT number then obtained at 319. A determination of whether the TUT is equal to the maximum number of trunks is determined at 320. If the answer to this query is "no", the TUT number is incremented as indicated at 321 and the GET DTMF subroutine is entered as indicated at 322. After hearing that the dial tone was terminated when the relay for the TUT was de-activaeed at 317, the technician would send a DTMF character using the telephone keyboard and using any key, except the # key, to cause the next trunk to be presented for testing. Thus, at 323 of the routine a determination is made as t whether the DTMF obtained at 322 was for the # key. If it was determined that the # key had not been used by the technician to step to the next trunk, the new TUT number is entered in the X register at 309. The procedure described with respect to 310–323 is then repeated until the query made at 310 is answered in the affirmative, if the control trunk is the trunk connected to relay K24. This would direct the MCU 15 to cause the tone generator 23, as indicated at 299, to provide a warble tone made up of a 480 HZ and a 620 HZ signal. With the routine proceeding to 318 where relays K27 and K28 are de-activated. At 319 of the routine, the TUT number would be obtained which would be "24" so that the query made at 320 as to whether the TUT number was equal to 25 would be answered in the negative causing the routine to proceed to 321 where the TUT number would be incremented. Receipt of the warble tone by the technician at the far end of the control trunk would indicate a need to send a DTMF to have trunk 25, which is connected to relay K25 to be connected. The query at 323, if a proper entry had been made by the technician, would be answered in the negative causing the routine to return to 309 with the routine then causing a dial tone to be presented on the trunk that is connected to relay K25 for the short term provided and at 320 the query as to whether the TUT was equal to the maximum trunks would be answered in the affirmative causing the routine to proceed to 324 at which point the relay K29 is de-activated. The routine then proceeds to 325 where it jumps to the command return routine.

Returning the query made at 307 in the scan trunk routine as set forth in FIG. 25, if the scan trunk command designated the trunk where the scan was to begin, the query at 307 would have been answered in the negative causing the routine to proceed to 326. Here a determination is made as to whether the parameter count is equal to or greater than three. If it is found to be equal to or greater than three, the routine proceeds to 327 in FIG. 26 at which point a "2" is stored in error and the routine then jumps to the command return routine as indicated at 328. If the technician had entered the command properly, the query at 326 would have been answered "no" and the routine would proceed to 329 where the trunk number indicated by the parameter would be converted to an internal representation. The routine then proceeds to 330 where a query is made as to whether the trunk number is zero and, if answered in the negative, a query would be made at 331 as to whether the trunk number was less than maximum, i.e., less than 25. If such is the case, the routine proceeds to 332 where a query is then made as to whether the trunk number is equal to the number for the control trunk. If this query is answered in the negative, the routine proceeds to 333 where the TUT number is saved in the parameter counter. The routine then proceeds to 309 where such TUT number is loaded in the X register. The routine then proceeds as previously described.

Returning to the routine at 330, 331 and 332, if the query made at 330 had been answered in the affirmative or the query at 331 had been answered in the negative or the query at 332 had been answered in the affirmative, the routine would then have moved to 327 where a "2" would have been stored in error and the routine would then have jumped to the command return routine as indicated at 328.

Figure 4:
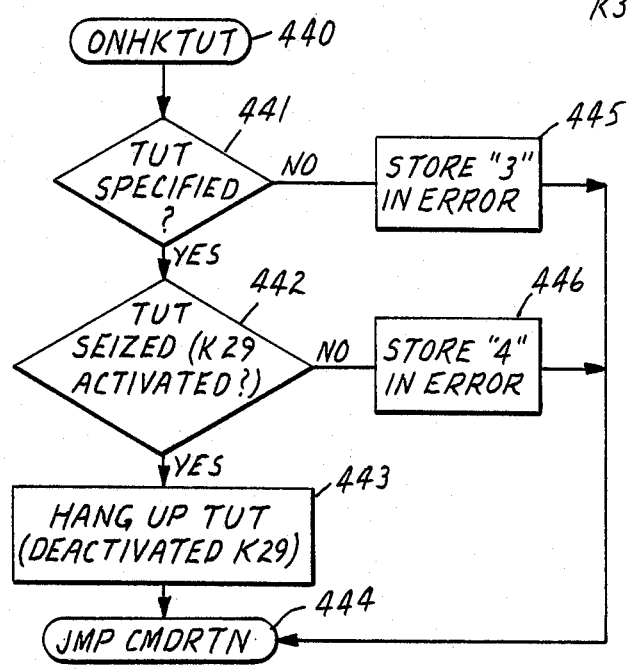
FIGS. 4-35 are flow diagrams depicting operation of the testing circuitry of FIGS. 1-3 under the control of a programmed microcomputer unit that is a part of the testing circuitry.

Referring to the dial pulse (DIALPUL), dial tone (DLTONE), and answer TUT (ANSTUT) routines, these routines operate to activate relay K29 and it remains activated when the routine is exited. Some of the test arrangements require the relay K29 to be de-activated if the command entered for one of such tests is to be effective. A command to de-activate relay K29 is available and the routine is set forth in FIG. 4. The command is referred to as the on hook TUT (ONHK-TUT) command. Referring to FIG. 10, the command uses the number "64", so the form for entry of the command is *64 #. Referring to FIG. 4, the routine begins at 440 and at 441 a query is made as to whether a TUT is specified and, if answered in the affirmative, a query is made at 442 as to whether relay K29 is actuated. If this query is answered in the affirmative, the relay K29 is de-activated, as indicated at 443, to hang up or place the TUT "on hook". The routine then jumps to the command return (CMDRTN) routine, as indicated at 444. If the query at 441 is answered in the negative, a "3", as indicated at 445, is stored in error and the routine then jumps to the command return routine, as indicated at 444. Similarly, if the query at 442 is answered in the negative, a "4", as indicated at 446, is stored in error with the routine then jumping to the command return routine, as indicated at 444.

Figure 27:
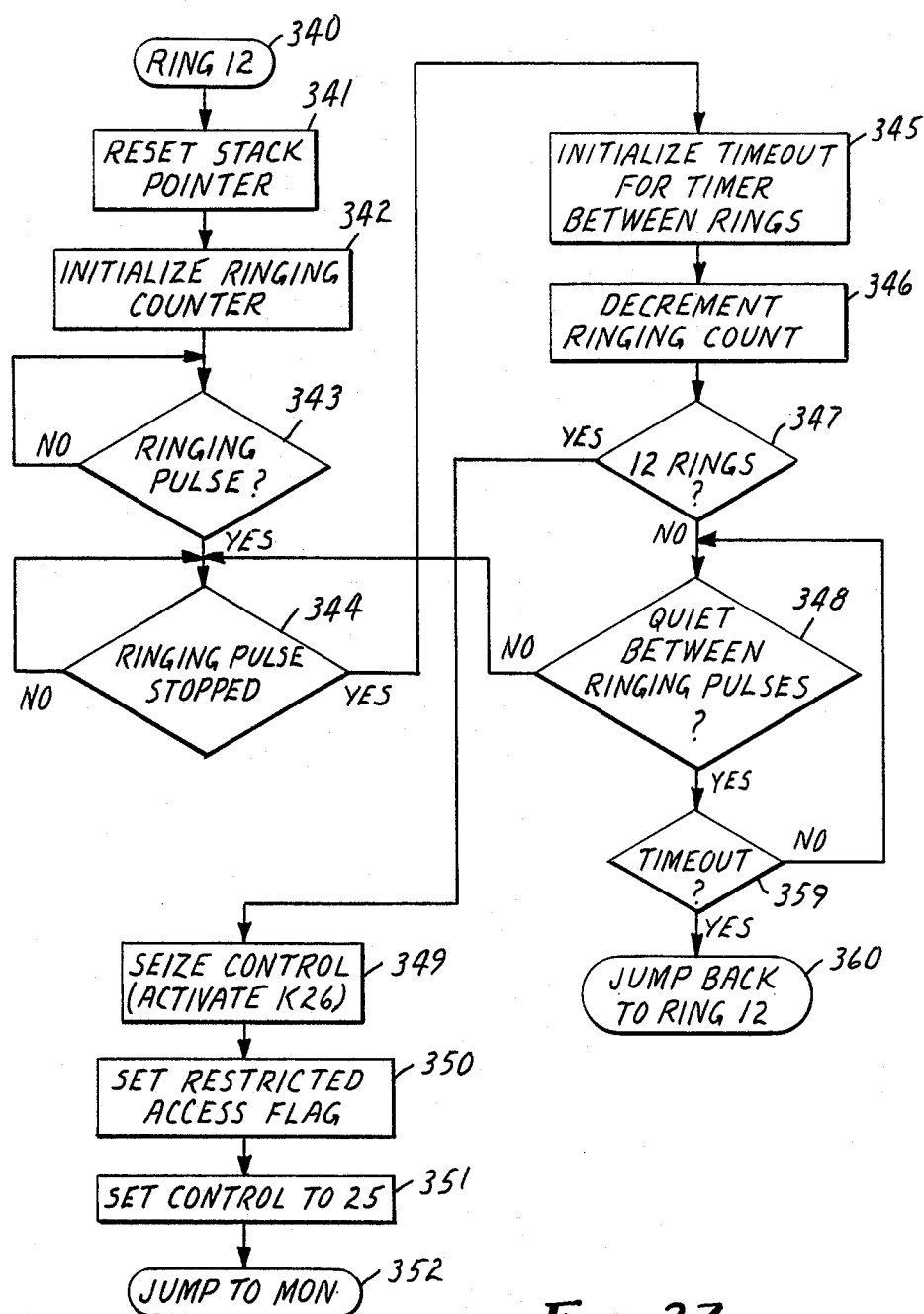

A description will now be provided for the various subroutines which were utilized in the command routines which have been discussed. The first one to consider is the ring 12 subroutine to which the check 6 (CHK6) routine jumps in the event bit 6 of PORT C was not equal to zero meaning that neither of the arming switches A1 or A2 were actuated to the "on" position. The flow diagram for the ring 12 subroutine is set forth in FIG. 27. This subroutine is entered if the MCU 15 is powered up to cause it to be reset and the operator does not operate either of the arming switches A1 or A2. The ring 12 subroutine is also entered in the event that the disconnect control (DISCNTL) routine is entered at any time. The ring 12 subroutine would be utilized at any time when the PBX is not being manned, such as at night and weekends, to provide a way for a technician to enter various commands for carrying out limited testing on the trunks for the PBX. Referring to FIG. 27, the routine is entered at 340 and at 341 the stack pointer is reset with the ringing counter initialized at 342. It should be pointed out that in order for the technician to gain access for entering various commands, when the ring 12 subroutine has been entered, it is necessary for the technician to place a call to the trunk that is connected to relay K25. Thus at 343 in the routine, a query is made as to whether a ringing pulse is detected. If the technician has placed a call to the trunk connected to relay K25, the ringing pulses would be detected by the ringing detector 30 which would cause a signal to be provided at bit PD4 of PORT D bit of the MCU 15 to indicate such detection. The query at 343 continues until such time as a ringing pulse is detected at which time the routine proceeds to 344 where a query is made as to whether the ringing pulse has stopped. When a ringing pulse ceases, the ringing detector circuit 30 will provide a different signal at the bit PD4 of PORT D so the MCU 15 will be informed that the ringing pulse has stopped. This query is made at 344 until it is determined that the ringing pulse has stopped at which time the routine proceeds to 345 where a timer is initialed that is used to determine a timeout period that is equal to the time that should transpire between rings. The ringing count is then decremented, as indicated at 346, and a query is made at 347 as to whether the count indicates that 12 rings have been received. If this is answered in the negative, the routine proceeds to 348 where a query is made as to whether it is still quiet between the ringing pulses. If this query is entered in the negative, which would be the case if another ringing pulse were received, the routine returns to 344 where a query is then made as to whether the ringing pulse has stopped. This routine is then continued as has been described until the query at 347 is answered in the affirmative causing the routine to proceed to 349 where the relay K26 is actuated to cause the control trunk that is connected to relay K25 to be "seized" or placed in an off hook condition. The restricted access flag is then set at 350 and the control is indicated in the MCU 15 to be 25. It will be recalled that reference is made in some of the command routines as to whether the access flag was set or the query may have been in the form as to whether full access was available. Full access is not provided if the ring 12 subroutine is used since the restricted access flag will be set. The routine then proceeds to 352 where a jump is made to the monitor (MON) routine. As has been described, the monitor routine is the routine which enables the technician to enter the password that is necessary to allow him to begin sending commands to the MCU 15. Returning to the ring 12 subroutine in FIG. 27, if there was quiet observed between ringing pulses, the routine would proceeds to 353 and a determination would be made as to whether the timeout period had expired and, if it were answered in the negative, the routine would loop back to the query regarding the presence of quiet between the ringing pulses as indicated at 348. If it were found at 359 that the timeout period had expired, the routine would then proceed to 359 which is a jump back to 340 of the ring 12 subroutine.

Figure 28:
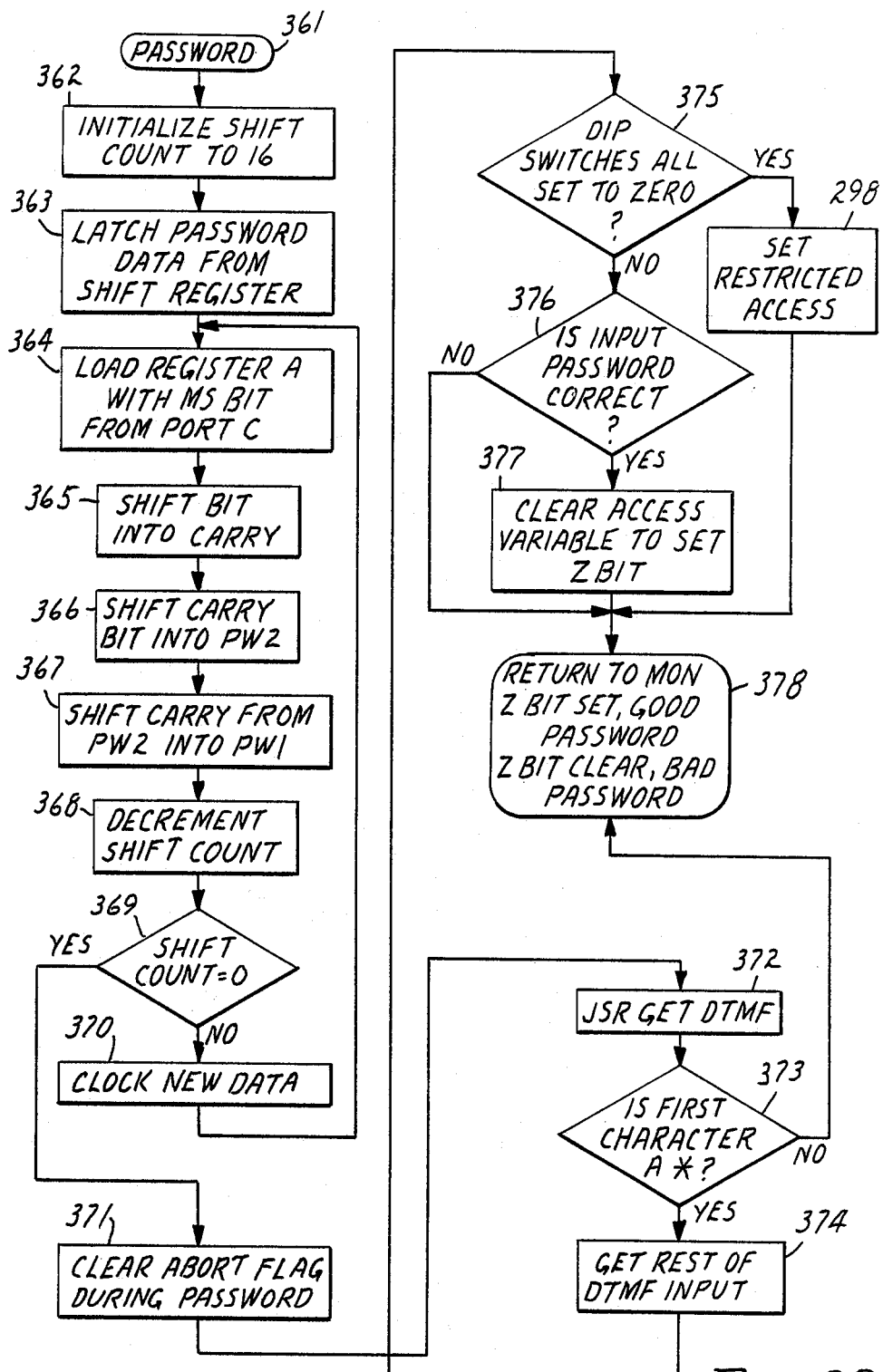

The password subroutine was mentioned in connection with the monitor (MON) routine but was not described in any detail. The password subroutine is set forth in FIG. 28. The password subroutine is entered during the monitor routine which is set forth in FIG. 7 and is entered after a 2,225 HZ tone burst has been transmitted to the technician at the far end of the control trunk inviting him to enter the password. Turning to FIG. 28, the routine begins at 361 and moves to 362 where the shift count is initialized to 16. At 363, the password data from the shift registers provided in the password circuit 18 are latched. Proceeding to 364 in the routine, register A is loaded with the most significant bit from PORT C of the MCU 15. This bit is then shifted into carry, as indicated at 365, and then into the most significant bit of memory location PW2 as indicated at 366. At 367, the carry from memory location PW2 is shifted into the most significant bit of memory location PW1 and the shift count is then decremented at 368. A determination is then made at 369 as to whether the shift count is equal to zero and, if it is answered in the negative, the routine clocks new data into the register A as indicated at 370. This routine as described is repeated until all the password data is stored in the MCU 15. At this point the query at 369 would be answered in the affirmative since the shift count would be zero causing the routine to proceed to 371 where the abort flag is cleared so the abort function cannot be used during the password subroutine. If the abort flag were set, a second * entry would cause the entry being made to be aborted. After the abort flag is cleared, the routine proceeds to 372 which involves a jump to the GET DTMF subroutine. The technician at the far end of the control trunk will, of course, be sending DTMF signals which are representative above the password as it is entered on the telephone keyboard by the technician. The DTMF signals are obtained and a query is made at 373 as to whether the first character is a *. If this query is answered in the affirmative, the routine proceeds to 374 where the rest of the DTMF input is obtained with a query then being made at 375 as to whether all the dip switches provided by the two switches 19, 20 are all set to zero. If this query is answered in the negative, the routine proceeds to 376 where a query is made as to whether the input password is correct. If it is found to be correct, the routine proceeds to 377 where the access variable is cleared and the two-bit is set. The routine proceeds to 378 which calls for a return to the MON routine with the 2-bit set indicating a good password. A return would have been made to monitor if the query at 373 indicated that the first character was not a * which would result in bit 2 being cleared to indicate a bad password. Returning to the query at 375, if all of the dip switches were set to zero, the restricted access flag would be set as indicated at 298 and the routine would proceed to 378.

Figure 29:
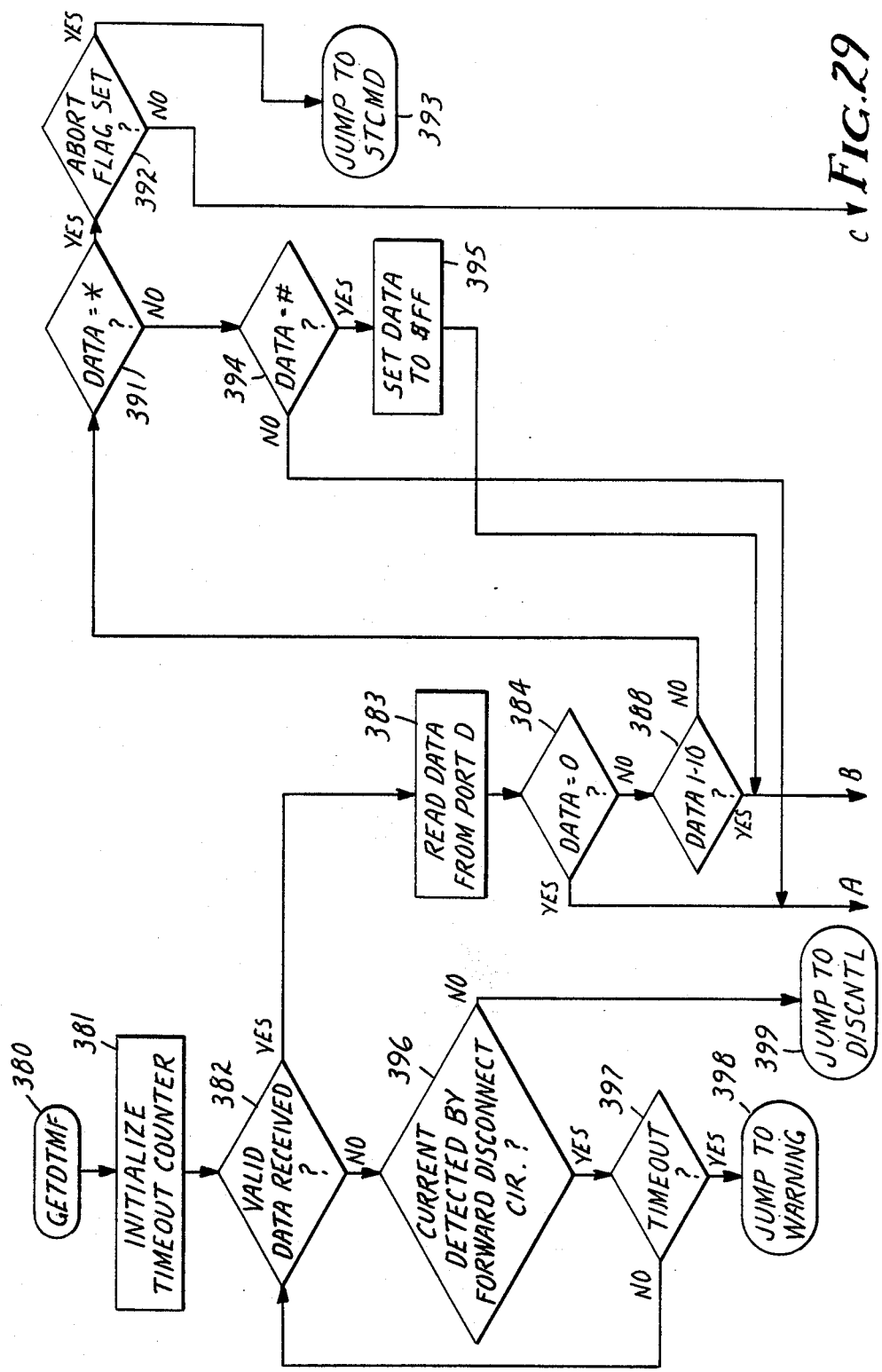

Another subroutine which has been referred to in connection with the routines that have been described is the GET DTMF subroutine which is set forth in FIGS. 29 and 30. The routine can best be followed if FIG. 29 is placed above FIG. 30. The routine is entered at 380 and at 381 a timeout counter is initialized which provides for a one minute time period. This time period requires that any DTMF signal that are to be provided must be provided within the one minute time period. The query is made at 382 in the routine as to whether valid data is received. If this query is answered in the affirmative, the data is read from PORT D of the MCU 15 as indicated at 383. A query is then made at 384 in the routine as to whether the data equals zero. This situation can occur if a 16-key touch pad type telephone was used for transmitting the DTMF signals. If the query is answered in the affirmative, the routine proceeds to 385 of the routine where a "6" is set in error. Proceeding to 386 in the routine, the stack pointer is reset and the routine jumps to the command return routine as indicated at 387. Returning to the query made at 384, if the query was answered in the negative, a query is then made at 388 as to whether the data is 1-10. If this query is answered in the affirmative, the routine proceeds to 389 where the data is stored in a variable memory location. The routine then returns to the calling routine as indicated at 390. Had the query made at 388 indicated that the data was not anything from 1-10, the routine would have proceeded to 391 where a query is made as to whether the data is a *. If the query is answered in the affirmative, the routine proceeds to 392 where a determination is made as to whether the abort flag is set. If the abort flag is set, the routine jumps to the start command routine as indicated at 393. If the abort flag was not set, the routine would proceed to 390 which calls for a return to the calling routine. Had the query at 391 been answered in the negative, the routine would then proceed to 394 where a query is made as to whether the data represents a #. If the query is answered in the negative, the routine proceeds to 385 where a "6" is set in error and the stack pointer is then reset, as indicated at 386, with the routine then jumping to the command return routine as indicated at 387. Had the query at 394 been answered in the affirmative, the data would be set to $FF as indicated at 395 and the routine would then proceed to 389 where the data is stored in a variable memory location with the routine then proceeding to 390 where a return is made to the calling routine.

Figure 31:
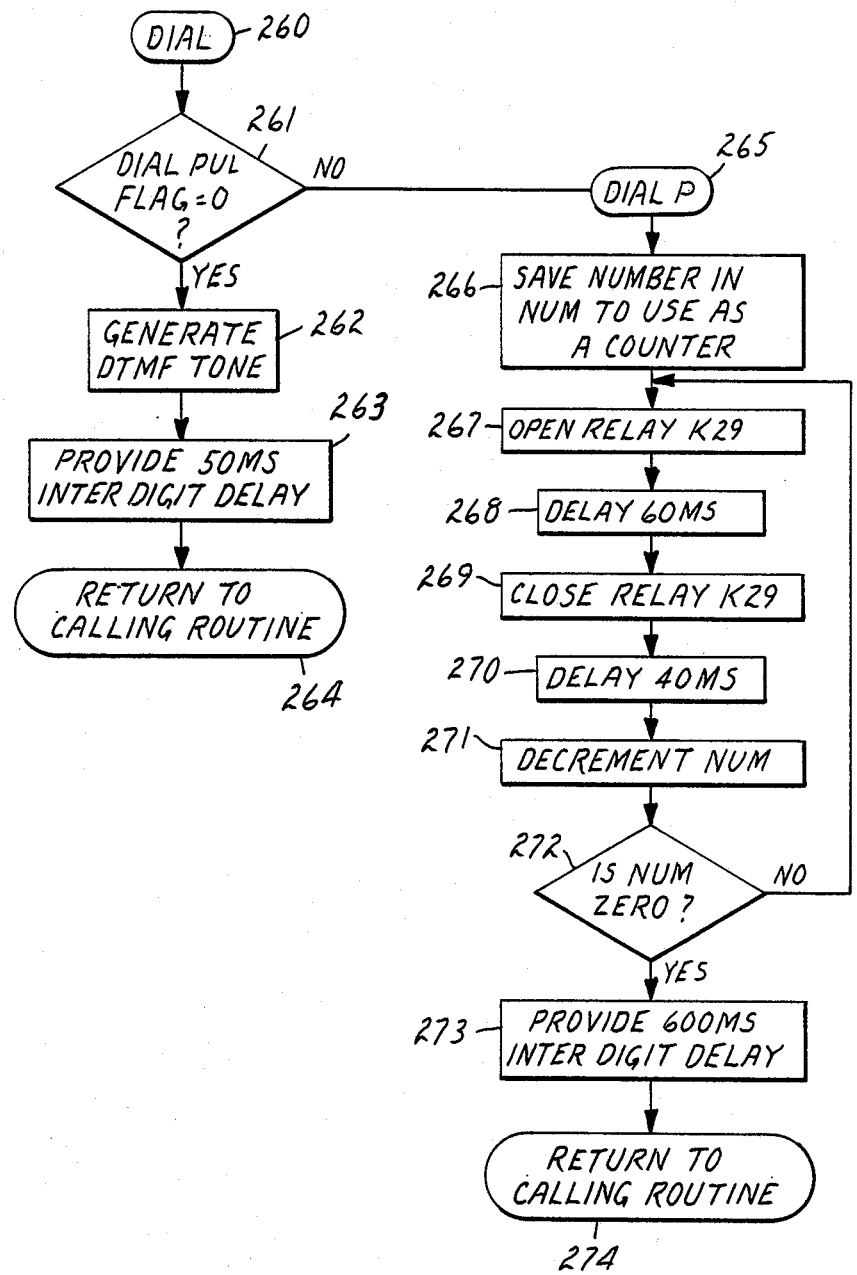

The dial subroutine which comes into play in the dial pulse (DIALPUL) and dial tone (DLTONE) routines will now be discussed in detail. The dial subroutine is set forth in FIG. 31. The routine begins at 260 and then proceeds to 261 where a query is made as to whether the dial pulse flag is equal to zero. If it is answered in the affirmative, this means that the dial tone routine was being utilized. The routine proceeds to 262, at which point the tone generator 23 under the control of the MCU 15 generates a DTMF tone for the digit obtained during the dial tone (DLTONE) routine. A 50 millisecond inner digit delay is then provided at 263 and the routine returns to the calling routine, as indicated at 264. Had the query at 261 been answered in the negative, it would have indicated that the dial pulse command had been utilized. The routine then proceeds to 265 for a beginning of a pulse dialing subroutine and then proceeds to 266 where the number to be dialed, which was obtained during the dial pulse (DIALPUL) routine, is saved in a memory location for use as a counter. This memory location is referred to as NUM. The pulses for placing the call are obtained by actuation and de-actuation of the relay K29 in accordance with the number to be called. Accordingly, the routine proceeds to 267 where the relay K29 is opened with a 60 millisecond delay provided at 268 followed by closure of the relay K29 at 269 with a further delay of 40 milliseconds provided at 270. The memory for the number that is being dialed is then decremented, as indicated at 271, with a query made at 272 as to whether the count for the number is zero. If the query is answered in the negative, the routine returns to 267 where the routine then operates to provide another opening and closure of the relay K29, with a query at 272 again repeated. When the query at 272 is answered in the affirmative, this means the required number of pulses for the number has been transmitted causing the routine to be moved to 273 where a 600 millisecond inner digit delay is provided. The routine then proceeds to 274 for return to the calling routine.

At various points in the routines that have been discussed, signals at various frequencies are transmitted, including signals involving the use of two frequencies such as DTMF signals and the warble tone signal. It was indicated that the signals at the various frequencies are generated by the tone generator 23 under the control of the MCU 15. Considering this aspect in more detail, such generation involves the use of a 256 sample sine wave table. The table is made up of values to be written to the digital-to-analog converter of the tone generator 23 to generate a sine wave. The output of the digital-to-analog converter is filtered to remove higher frequency components. Each frequency to be generated using the sine wave table is associated with a particular constant or delta. The size of the delta determines how fast an index steps through the sine wave table, the larger the delta, the faster the index steps through the sine wave table, and, therefore, the higher the frequency. To generate a given frequency, the delta for that frequency is stored in memory. The delta is a 16-bit number which requires two 8-bit memory locations. Next, two 8-bit memory locations are set to zero and these locations will be used as an accumulator. The accumulator represents a 16-bit number. The least significant 8-bits of the delta is then added to the least significant 8-bits of the accumulator, with the result of this addition stored back in the accumulator. The most significant 8-bits of the delta is then added to the most significant 8-bits of the accumulator and the carry from the addition of the least significant bytes. This result is then stored back in the accumulator and is also used as an index into the sine wave table. This index points to the value to be stored in the digital-to-analog converter. The frequency generation process continues by looping back to the addition of the deltas and the accumulators. The answer milliwatt subroutine which is used in conjunction with the answer TUT routine to provide a 1,004 HZ signal to indicate when a ringing signal is detected at the ringing detector circuit 30 will be described. The answer milliwatt (ANSMW) subroutine is set forth in FIG. 32 which appears alongside FIG. 19. The answer milliwatt routine begins at 400 in FIG. 32 and the proceeds to 401 where the delta is set up for a 1,044 HZ signal. At 402 the frequency accumulators are cleared, with the routine then proceeding to 403 where the low or least significant 8-bits of the accumulator are added to the delta. The result of this addition is then stored in the accumulator as indicated at 404. At 405 the upper or most significant 8-bits of the accumulator are added to the delta together with the carry from the addition of the lower or least significant bits. At 406 the result of the addition is then saved in the accumulator. The result is also transferred to the X register for use as an index to the sine table as indicated at 407. At 408 data is obtained from the sine table, which is stored in the register, with such data being written into the digital-to-analog converter as indicated at 409. Since the 1,004 HZ signal is only to be generated for the time that the ringing pulse is detected at the ringing detector circuit 30 during the answer TUT routine, a query is made at 410 to determine whether the ringing pulse is present. If the ringing pulse is present, the routine loops back to 403 of the routine. If the query is answered in the negative, a return is made to the calling routine as indicated at 411. This same routine would be utilized for other single frequency signals to be generated wherein, at point 401 of the routine, the delta would be set for the particular frequency that is to be generated. In addition, the query made at 410 would be with relation to whether a counter is equal to zero and, if not, a loop would be made back to 403 in the routine. A counter would thus be used to determine the length of the signal to be generated.

The method that is used in the answer milliwatt subroutine for producing a signal of a single frequency, which has just been described, is utilized in the DTMF subroutine. The DTMF subroutine is utilized as a subroutine to the dial subroutine and relates to the production of DTMF tones which involve signals of two frequencies. In the DTMF subroutine, the method used in the answer milliwatt subroutine is used to the extent that data required for one single frequency is added to the data obtained for another single frequency to produce composite data which is then applied to the digital-to-analog converter of the tone generator 23.

Figure 33:
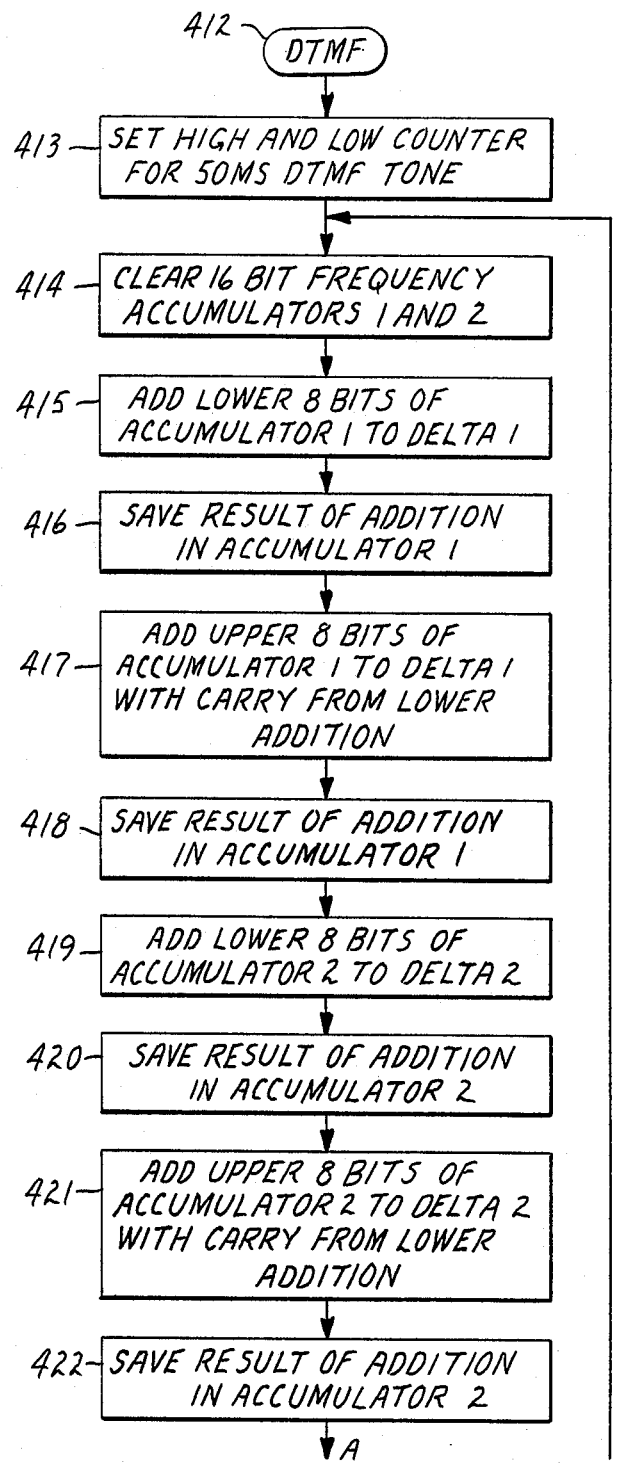
Figure 34:
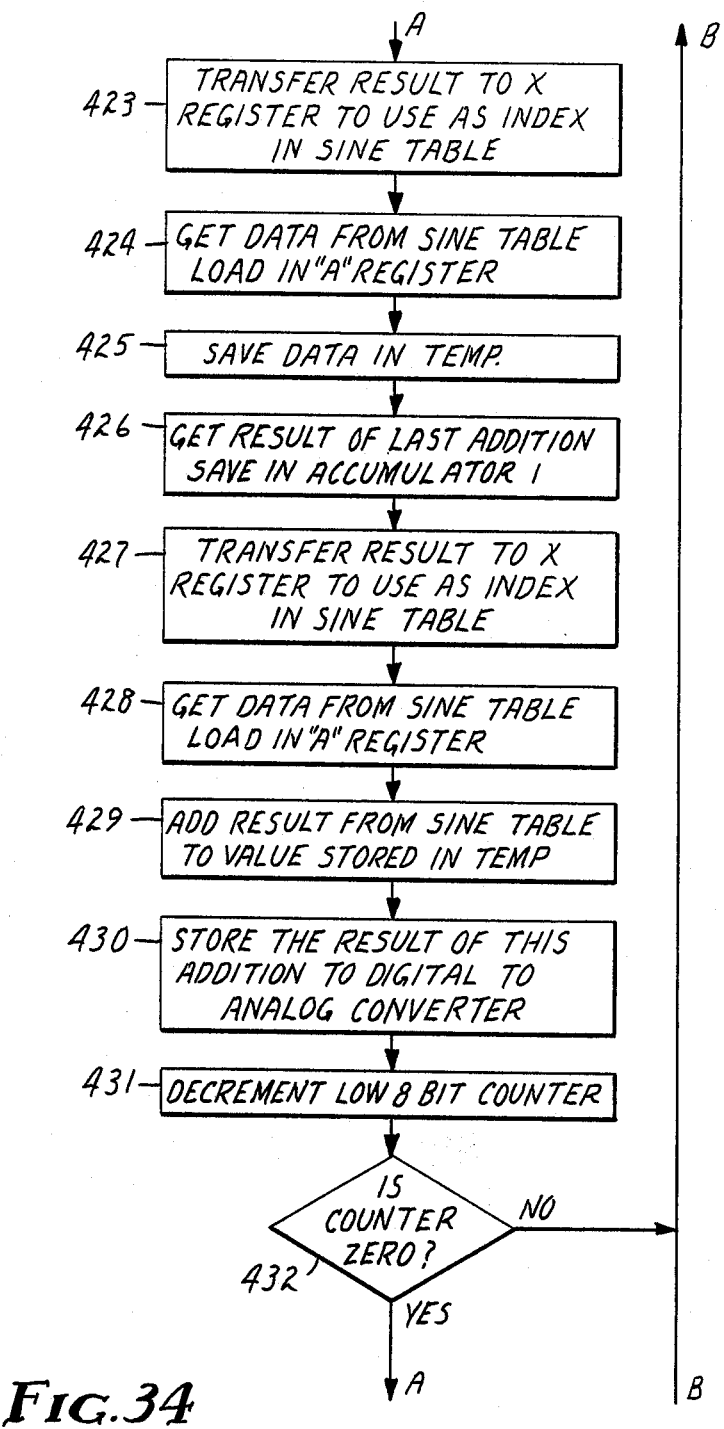
Figure 35:
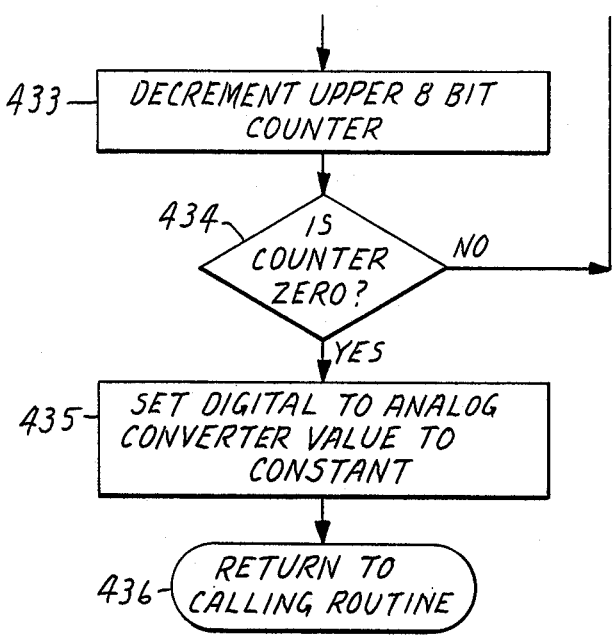

The DTMF subroutine is set forth in FIGS. 33–35. In order that the DTMF subroutine can be seen in its entirety, the figures should be arranged in line with FIG. 33 at the top and FIG. 35 at the bottom. Referring to FIG. 33, the DTMF subroutine begins at 412 and proceeds to 413 where the high frequency and low frequency counters for providing a 50 millisecond DTMF tone are set. At 414 of the routine, 16-bit frequency accumulators 1 and 2 are cleared. As indicated at 415, the lower or least significant 8-bits of accumulator 1 are added to the lower 8-bits of delta 1 with the result of addition saved in accumulator 1 as indicated at 416. At 417, the upper or most significant 8-bits of accumulator 1 are added to the upper 8-bits of delta 1 in addition to the carry from the lower addition, with the results of such addition saved in the upper 8-bits of accumulator 1 as indicated at 418. The foregoing process is also carried out with respect to accumulator 2 and the lower 8-bits of delta 2 in that the lower or least significant 8-bits of accumulator 2 are added to delta 2, as indicated at 419, with the result of such addition being saved in the lower 8-bits of accumulator 2 as indicated at 420. As indicated at 421, the upper or most significant 8-bits of accumulator 2 are added to the upper 8-bits of delta 2 along with the carry from the lower addition accomplished at 419, with such result of addition being saved in the upper 8-bits of accumulator 2 as indicated at 422. This result is then also transferred to the X register, as indicated at 423, for use as an index in the sine table. Data from the sine table that pointed to by the X register is then loaded in the "A" register as indicated at 424. This data is then saved in a temporary register as indicated at 425. At 426 the result of addition saved in the upper 8-bits of accumulator 1 is obtained, and at 427 such result is transferred to the X register for use as an index in the sine table. At 428 data from the sine table, which is pointed to by the index established at 427, is loaded in the "A" register. Procceeding to 429 in the routine, the data obtained at 428 is then added to the value stored in the temporary memory as indicated at 425. The result of this addition is then stored in the digital-to-analog converter, as indicated at 430, and the low or least significant 8-bit counter is decremented as indicated at 431. A query is made at 432 as to whether such counter is equal to zero and, if it is answered in the negative, the routine returns to 413 in FIG. 33. If the query is answered in the affirmative, the routine proceeds to 433 in FIG. 35 where the upper or most significant 8-bit counter is decremented. A query is then made at 434 to determine whether such counter is equal to zero and, if the answer is in the negative, the routine returns to 414 in FIG. 33. If the query made at 434 is answered in the affirmative, the routine proceeds to 435 where the digital-to-analog converter is set to a constant. The routine then returns to the calling routine as indicated at 436.

Another subroutine to be considered which was indicated in connection with the GET DTMF routine is the warning subroutine to which a jump is made in the event a time period that is provided in connection with the GET DTMF routine expires. This subroutine provides for a warning signal, which is a warble tone, to be transmitted to the far end of the control trunk and provides for a short time period, such as six seconds, to allow the technician to enter any valid DTMF digit causing the routine to then jump to the start command routine. Should the technician fail to send a valid DTMF digit and the six second time period expires, the routine moves to the disconnect control routine with a jump then to the ring 12 routine occurring. The flow diagram for the warning routine is set forth in FIG. 24. This routine begins at 450 and moves to 451, at which point the relays K27 and K28 are operated so that any transmission from the differential amplifier 35 will be transmitted to the far end of the control trunk. The routine then proceeds to 452 which provides for a transmission of a warning tone which will be provided by the tone generator 23 under the control of the MCU 15 for transmission to the far end of the control trunk via the differential amplifier 35. The warning tone is in the form of a warble tone made up of a 480 HZ and 620 HZ signal. Relays K27 and K28 are then de-activated, as indicated at 453 of the routine, with a short timeout period, such as six seconds, being provided at 454. Having heard the warble tone, the technician, if he wishes to continue, must send a valid DTMF digit within the six second period that is provided. After the six second time period is provided, a query is made at 455 in the routine as to whether a valid DTMF digit has been received. If this query is answered in the affirmative, a jump is made to the start command routine as indicated at 456. If a valid DTMF digit has not been received, the routine proceeds to 457 where a query is made as to whether the six second timeout period has expired and, if it has not expired, a return is made to 455 in the routine. If the query regarding expiration of the six second period made at 457 is answered in the affirmative, the routine proceeds to the disconnect control routine, as indicated at 58, which results in a jump to the ring 12 routine as indicated at 61.

The foregoing description of the invention has been presented for purposes of illustration and description and is not intended to be exhaustive or to limit the invention to the precise forms disclosed, since many modifications and variations are possible in light of the above teaching. The embodiment described is the present best mode for practicing the invention and the description of it provides a complete explanation of the principles of the invention and its practical application to enable others skilled in the art to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

We claim:

1. Telephone trunk line testing circuitry for connection to a private branch exchange (PBX) and the plurality of telephone trunk lines of the public telephone system provided for the PBX, the testing circuitry including:
    a microcomputer unit (MCU);
    first means connected to said MCU and having a receive input and a transmit output for transmission of signals under the control of said MCU between said receive input and said transmit output;
    a dual tone multiple frequency (DTMF) receiver connected to said MCU and operably connected to receive any signals presented to said receive input;
    a tone generator operatively controlled by said MCU and operatively connected to said transmit output;
    a first pair of transmission paths;
    a second pair of transmission paths;
    a first switching means operatively controlled by said MCU programmed for selectively providing any one of the following connecting conditions:
    (1) connecting said first pair of transmission paths to said receive input and said second pair of transmission paths to said transmit output;
    (2) connecting said first pair of transmission paths to said transmit output and said second pair of transmission paths to said receive input; and
    (3) connecting said first pair of transmission paths to said second pair of transmission paths;
    first switch means operably connected to said MCU for selecting a trunk line as a control trunk line; and
    second means operably controlled by said MCU, when said first switching means presents said connecting condition (1), for coupling the control trunk line selected by operation of said first switch means to said first pair of transmission paths following the completion of a call via the public telephone system between a DTMF type telephone and the control trunk line selected by operation of said first switch means, said control trunk when so connected serving to transmit any DTMF signals to said DTMF receiver that are generated by operation of the keyboard of the DTMF type telephone.

2. Telephone trunk line testing circuitry according to claim 1 wherein said MCU is programmed to require said DTMF receiver, after a control trunk line has been connected to said first pair of transmission paths by said second means, to receive a predetermined series of DTMF signals before any additional DTMF signals can be supplied to said DTMF receiver.

3. Telephone trunk line testing circuitry according to claim 1 wherein said MCU is programmed for responding to a predetermined series of DTMF signals received by said DTMF receiver, after a control trunk line has been coupled to said first pair of transmission paths by said second means, to cause said first switching means to provide the connecting condition (2) and then cause said tone generator to provide a signal at a selected frequency for transmission at a predetermined power level to the connected control trunk for a limited period of time via the connecting condition (2).

4. Telephone trunk line testing circuitry according to claim 1 and further including:
    third means operably controlled by said MCU and having a third pair of transmission paths; said MCU programmed for responding to at least one command, comprising DTMF signals, received via said DTMF receiver for causing said third means to disconnect one of the other trunk lines from the PBX and connect it to said third pair of transmission paths.

5. Telephone trunk line testing circuitry according to claim 4 wherein said one of the other trunk lines is designated by said one command.

6. Telephone trunk line testing circuitry according to claim 4 wherein said one command for causing said third means to connect one of the other trunks to said third pair of transmission paths also provides for termination of such connection after a limited period of time.

7. Telephone trunk line testing circuitry according to claim 4 further including a second switch means positionable for coupling said third pair of transmission paths to said second pair of transmission paths and wherein said MCU is programmed so said one command for causing said third means to disconnect one of the other trunk lines from the PBX and connect it to said third pair of transmission paths also causes said first switching means to provide said connecting condition (2) and causes said second switch means to be positioned to couple said third pair of transmission paths to said second pair of transmission paths for a limited period of time.

8. Telephone trunk line testing circuitry according to claim 4 further including a second switch means positionable for coupling said third pair of transmission paths to said second pair of transmission paths; and a ringing detector circuit connected to detect telephone ringing signals on said third pair of transmission paths, said ringing detector circuit having an output connected to said MCU at which a signal is provided indicative of said ringing detector circuit detecting a ringing signal; and wherein said MCU is programmed so said one command also causes said second switching means to be positioned to couple said third pair of transmission paths to said second pair of transmission paths upon said ringing detector circuit detecting telephone ringing signals.

9. Telephone trunk line testing circuitry according to claim 8 wherein said MCU is programmed so a predetermined command, comprising DTMF signals received via said DTMF receiver, after said one command has caused said second switching means to be positioned to couple said third pair of transmission paths to said second pair of transmission paths, causes said first switching means to provide said connecting condition (3) for a limited period of time.

10. Telephone trunk line testing circuityy according to claim 8 wherein said MCU is programmed so a predetermined command, comprising DTMF signals received via said DTMF receiver, after said one command has caused said second switching means to be positioned to couple said third pair of transmission paths to said second pair of transmission paths, causes said first switching means to provide said connecting condition (2) for a limited period of time.

11. Telephone trunk line testing circuitry according to claim 8 wherein said MCU is programmed so a predetermined command, comprising DTMF signals received via said DTMF receiver, after said one command has caused said second switching means to be positioned to couple said third pair of transmission paths to said second pair of transmission paths, causes said first switching means to provide said connecting condition (1) for a limited period of time.

12. Telephone trunk line testing circuitry according to claim 8 wherein said MCU is programmed so a predetermined command, comprising DTMF signals received via said DTMF receiver, after said one command has caused said second switching means to be positioned to couple said third pair of transmission paths to said second pair of transmission paths, causes said first switching means to provide said connecting condition (1) for a limited period of time and during such period of time causes said tone generator to generate a signal at a selected frequency and at a predetermined power level.

13. Telephone trunk line testing circuitry according to claim 4 wherein said MCU is programmed so a command for pulse or tone dialing, which includes DTMF signals for a telephone number and is received via said DTMF receiver when said third means connects one of the other trunks to said third pair of transmission paths and said second switch means is not positioned to couple said third pair of transmission paths to said second pair of transmission paths, causes said second switch means to be positioned to couple said third pair of transmission paths to said second pair of transmission paths and then causes pulse or tone signals for said telephone number to be sent over the trunk connected to said third pair of transmission paths and upon completion of the transmitted pulse or tone signals causes said first switching means to provide said connecting condition (3) for a limited period of time.

14. Telephone trunk line testing circuitry according to claim 13 wherein said MC is programmed so a predetermined command, comprising DTMF signals received via said DTMF receiver, after a command for pulse or tone dialing has been received by said DTMF receiver, causes said first switching means to provide said connecting condition (1) for a limited period of time.

15. Telephone trunk line testing circuitry according to claim 13 wherein said MCU is programmed so a predetermined command, comprising DTMF signals received via said DTMF receiver, after a command for pulse or tone dialing has been received by said DTMF receiver, causes said first switching means to provide said connecting condition (2) for a limited period of time.

16. Telephone trunk line testing circuitry according to claim 13 wherein said MCU is programmed so a predetermined command, comprising DTMF signals received via said DTMF receiver, after a command for pulse or tone dialing, causes said first switching means to provide said connecting condition (3) for a limited period of time.

17. Telephone trunk line testing circuitry according to claim 13 wherein said MCU is programmed so a predetermined command, comprising DTMF signals received via said DTMF receiver, after a command for pulse or tone dialing, causes said first switching means to provide said connecting condition (3) for a limited period of time and during such period of time causes said tone generator to generate a signal at a selected frequency and at a predetermined level.

* * * * *

UNITED STATES PATENT AND TRADEMARK OFFICE
CERTIFICATE OF CORRECTION

PATENT NO. : 4,794,632

DATED : December 27, 1988

INVENTOR(S) : Peter G. Burton and James K. Kennedy

It is certified that error appears in the above-identified patent and that said Letters Patent is hereby corrected as shown below:

Column 3, line 19, correct "patss" to --paths--.

Column 3, line 57, delete "and", third occurrence.

Column 8, line 10, correct "ff" to --of--.

Column 8, line 28, correct "$uch" to --Such--.

Column 8, line 50, correct "hhe" to --the--.

Column 9, line 58, correct "229" to --K29--.

Column 10, line 25, correct "trun" to --trunk--.

Column 10, line 33, correct "BBX" to --PBX--.

Column 11, line 43, correct "circuitr" to --circuitry--.

Column 13, line 5, correct "gnnerates" to --generates--.

Column 13, line 35, correct "an" to --and--.

UNITED STATES PATENT AND TRADEMARK OFFICE
CERTIFICATE OF CORRECTION

PATENT NO. : 4,794,632

DATED : December 27, 1988

INVENTOR(S) : Peter G. Burton and James K. Kennedy

It is certified that error appears in the above-identified patent and that said Letters Patent is hereby corrected as shown below:

Column 13, line 49, correct "variousttest" to --various test--.

Column 14, line 7, correct "ad" to --and--.

Column 14, line 16, correct "oo" to --to--.

Column 14, line 48, correct "positoon" to --position--.

Column 14, line 52, correct "decisio" to --decision--.

Column 16, line 39, correct "comaand" to --command--.

Column 16, line 62, correct "DDTMF" to --DTMF--.

Column 17, line 14, change "tiis" to --this--.

Column 18, line 65, correct "hhat" to --that--.

Column 19, line 3, correct "routin" to --routine--.

Column 20, line 23, correct "activaeed" to --activated--.

UNITED STATES PATENT AND TRADEMARK OFFICE
CERTIFICATE OF CORRECTION

PATENT NO. : 4,794,632                                Page 3 of 4
DATED     : December 27, 1988
INVENTOR(S) : Peter G. Burton and James K. Kennedy It is certified that error appears in the above-identified patent and that said Letters Patent is hereby corrected as shown below:

Column 20, line 67, correct "ttrunk"" to --trunk--.

Column 22, line 14, correct "557" to --157--.

Column 22, line 30, correct "ss" to --is--.

Column 23, line 21, correct "answeeed" to --answered--.

Column 23, lines 62 & 63, correct "involees" to --involves--.

Column 23, line 64, correct "enteredaafter" to --entered after--.

Column 25, line 16, change "rottine" to --routine--.

Column 25, line 52, change "woul then proceeds" to --would then proceeds--.

Column 25, line 67, correct "hhen" to --then--.

Column 26, line 5, correct "wheee" to --where--.

UNITED STATES PATENT AND TRADEMARK OFFICE
CERTIFICATE OF CORRECTION

PATENT NO. : 4,794,632

DATED : December 27, 1988

INVENTOR(S) : Peter G. Burton and James K. Kennedy

It is certified that error appears in the above-identified patent and that said Letters Patent is hereby corrected as shown below:

Column 27, line 61, correct "rottine" to --routine--.

Column 29, line 21, correct "Clearning" to --Clearing--.

Column 29, line 22, correct "keysffor" to --keys for--.

Column 29, line 65, correct "de-activaeed" to --de-activated--.

Column 30, line 2, correct "t" to --to--.

Column 31, line 32, correct "theaarm-" to --the arm- --.

Column 35, line 20, correct "the" to --then--.

Signed and Sealed this

Nineteenth Day of December, 1989

*Attest:*

JEFFREY M. SAMUELS

*Attesting Officer*     *Acting Commissioner of Patents and Trademarks*